(12) United States Patent
Fujii

(10) Patent No.: US 6,763,028 B2
(45) Date of Patent: Jul. 13, 2004

(54) TRANSCEIVER APPARATUS

(75) Inventor: Masatsugu Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 767 days.

(21) Appl. No.: 09/758,085

(22) Filed: Jan. 10, 2001

(65) Prior Publication Data

US 2002/0015425 A1 Feb. 7, 2002

(30) Foreign Application Priority Data

Jun. 29, 2000 (JP) .................................. 2000-196648

(51) Int. Cl.[7] .............................. H04L 12/28; H04J 3/16
(52) U.S. Cl. ................................. 370/412; 370/468
(58) Field of Search ........................... 370/310, 328, 370/335, 336–350, 412–418, 395.7, 441, 468, 470, 471, 472, 473

(56) References Cited

U.S. PATENT DOCUMENTS

| | | | | |
|---|---|---|---|---|
| 5,159,596 A | * | 10/1992 | Itoh | 370/329 |
| 6,009,073 A | * | 12/1999 | Kaneko | 370/203 |
| 6,526,036 B1 | * | 2/2003 | Uchida et al. | 370/342 |
| 2002/0163921 A1 | * | 11/2002 | Ethridge et al. | 370/401 |
| 2003/0063507 A1 | * | 4/2003 | Manning | 365/200 |

FOREIGN PATENT DOCUMENTS

JP          61187429          8/1986

* cited by examiner

*Primary Examiner*—David Vincent
(74) *Attorney, Agent, or Firm*—Katten Muchin Zavis Rosenman

(57) ABSTRACT

A transmitting apparatus is provided with a transmit buffer for each of N-number of services for which the length of encoding time is $n_i \cdot T$ (i=1, 2, ..., N). The transmit buffer has a first storage unit for storing a length $n_i \cdot T$ (i=1, 2, ..., N) of transmit data, and a second storage unit for storing a reference time length T of transmit data. The following operation is carried out on a per-service basis: a length $n_i \cdot T$ of transmit data is stored in the transmit buffer in the lengths T at low speed; a length $n_i \cdot T$ of transmit data, which has already been stored in the transmit buffer, is read out in burst fashion at high speed in parallel with storage of a succeeding length T of transmit data in the transmit buffer; and storage and read-out of $n_i \cdot T$ lengths of transmit data are subsequently performed in parallel in similar fashion and the transmit data that has been read out is input to an encoding processor.

5 Claims, 22 Drawing Sheets

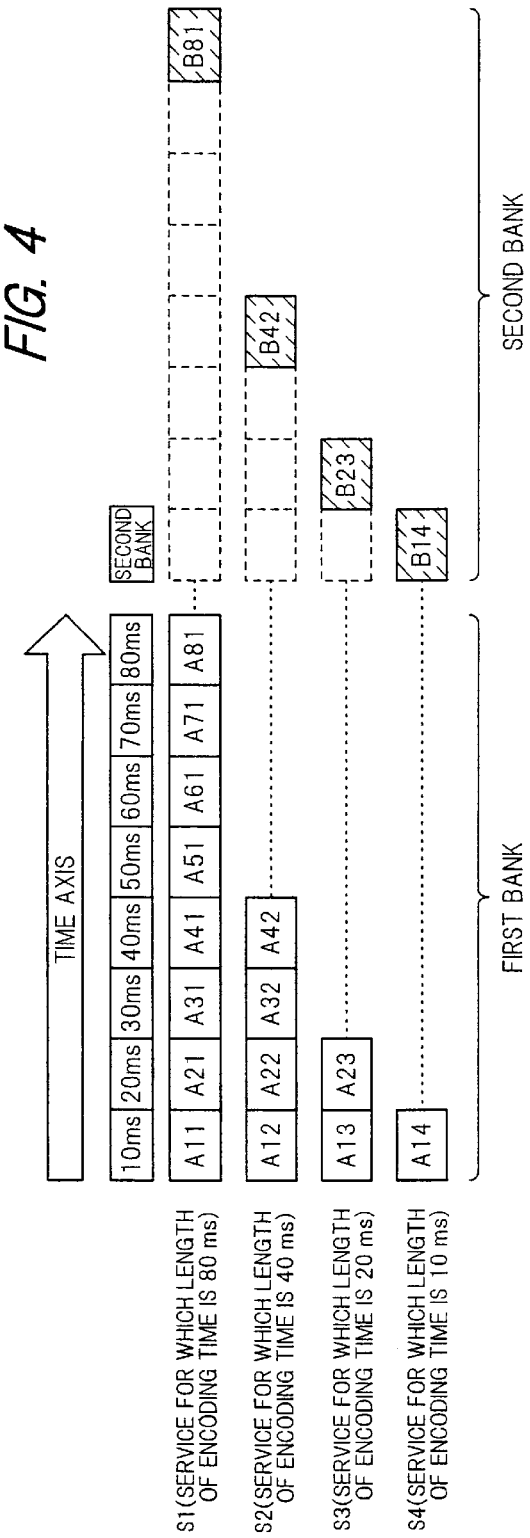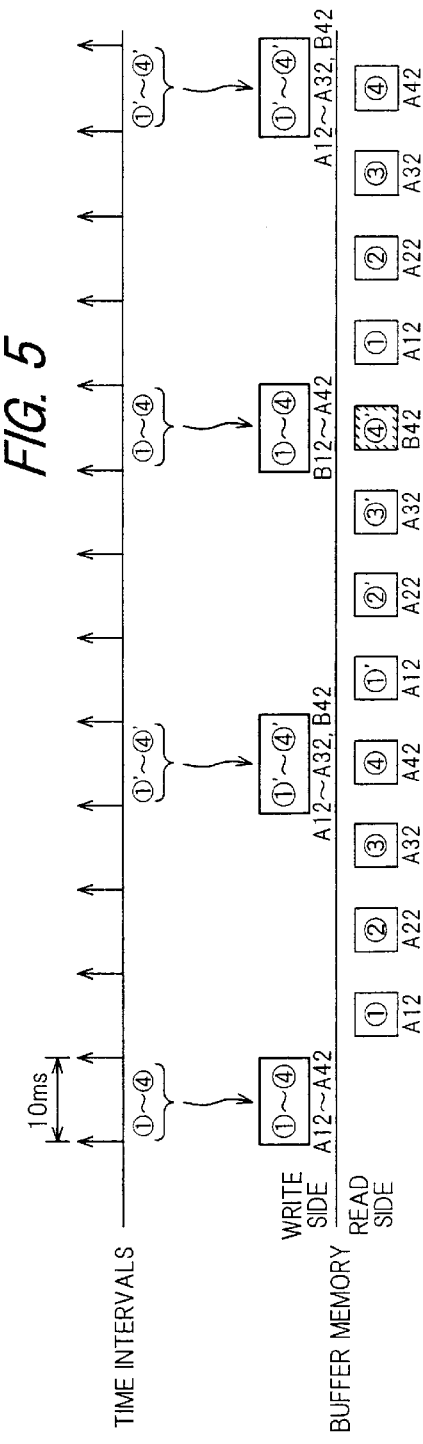

FIG. 29 PRIOR ART

| BANK 1 | | BANK 2 |
|---|---|---|
| SERVICE 1 (40 ms) | ⇔ SWITCHING EVERY 40 ms ⇔ | SERVICE 1 (40 ms) |
| SERVICE 2 (10 ms) | ⇔ SWITCHING EVERY 10 ms ⇔ | SERVICE 2 (10 ms) |
| SERVICE 3 (20 ms) | ⇔ SWITCHING EVERY 20 ms ⇔ | SERVICE 3 (20 ms) |
| FREE | | FREE |

FIG. 30 PRIOR ART

TIME AXIS →

SERVICE ↓

| | 10ms | 20ms | 30ms | 40ms | 50ms | 60ms | 70ms | 80ms |
|---|---|---|---|---|---|---|---|---|
| S1 | 640 | 640 | 640 | 640 | 640 | 640 | 640 | 640 |
| S2 | 640 | 640 | 640 | 640 | 640 | 640 | 640 | 640 |
| S3 | 640 | 640 | 640 | 640 | 640 | 640 | 640 | 640 |
| S4 | 640 | 640 | 640 | 640 | 640 | 640 | 640 | 640 |
| S5 | 640 | 640 | 640 | 640 | 640 | 640 | 640 | 640 |
| S6 | 640 | 640 | 640 | 640 | 640 | 640 | 640 | 640 |
| S7 | 640 | 640 | 640 | 640 | 640 | 640 | 640 | 640 |
| S8 | 640 | 640 | 640 | 640 | 640 | 640 | 640 | 640 | though the multiplexed signal, and to a receiving apparatus
TRANSCEIVER APPARATUS

BACKGROUND OF THE INVENTION

This invention relates to a transceiver and, more particularly, to a transmitting apparatus for dividing transmit data from each of a plurality of terminals into prescribed lengths of time, applying encoding processing to the divided data, multiplexing the encoded data thus obtained and transmitting the multiplexed signal, and to a receiving apparatus for demultiplexing multiplexed encoded data that has been received, applying decoding processing and sending the decoded data obtained to prescribed terminals.

In a CDMA (Code Division Multiple Access) mobile communications system, a base station spread-spectrum modulates control information and user information of multiple users using respective ones of different spreading code sequences, multiplexes and transmits the information, and each of a number of mobile stations transmits and receives information upon spreading and de-spreading the information using spreading codes specified by the base station.

FIG. 17 is a block diagram showing the structure of a mobile station according to the prior art. During reception, a radio unit 1 subjects a high-frequency signal received from an antenna $ANT_R$ to a frequency conversion (RF→IF conversion) to obtain a baseband signal. A quadrature detector 2 subjects the baseband signal to quadrature detection and outputs in-phase component (I component) data and quadrature component (Q component) data. A/D converters 3a, 3b convert the I-component and Q-component signals, respectively, to digital signals, and the digital signals enters a search 4 and respective ones of fingers $5_1$–$5_4$. If a direct sequence signal (DS signal) that has experienced multipath effects enters, the searcher 4 executes autocorrelation processing using a matched filter (not shown), detects multipaths and inputs, to the fingers $5_1$–$5_4$, despreading-start timing data and delay-time adjustment data for the various paths.

Each of the fingers $5_1$–$5_4$ has a despreader/delay-time adjustment unit 5a for performing dump integration by subjecting a direct wave or a delayed wave that arrives via a prescribed path to despread processing using a code identical with the spreading code, and for subsequently applying delay processing that conforms to the path and outputting a pilot signal (reference signal) and information signal; a phase compensator (channel estimation unit) 5b for averaging voltages of the I and Q components of the pilot signal over a prescribed number of slots and outputting channel estimation signals It, Qt; and a synchronous detector 5c for restoring the phases of despread information signals I', Q' to the original phases based upon a phase difference θ between a pilot signal contained in a receive signal and an already existing pilot signal. More specifically, the channel estimation signals It, Qt are cosine and sine components of the phase difference θ, and therefore the synchronous detector 5c demodulates the receive information signal (I,Q) (performs synchronous detection) by applying phase rotation processing to the receive information signal (I',Q') in accordance with the following equation using the channel estimation signal (It,Qt):

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

A rake combiner 6 combines signals output from the fingers $5_1$–$5_4$ and outputs the combined to a decoding processor (channel decoder) 7.

The decoding processor 7 subjects the input signal to error correction processing, decodes the original transmit data and stores the decoded data in a receive buffer 8. A data selector 9 inputs the decoded data, which has been stored in the receiver buffer 8, to prescribed terminal equipment (TE). Examples of the terminal equipment TE are a telephone 10, a facsimile transceiver 11, a personal computer 12 and an ISDN terminal 13. The telephone 10 is constituted by a voice codec 10a, a speaker 10b and a microphone 10c and is permanently connected to the data selector 9. The facsimile transceiver 11, personal computer 12 and ISDN terminal 13, however, are connected to the data selector 9 selective via an adapter 14'.

During transmission, the data selector 9 stores transmit data, which enters from an originating terminal, in a transmit buffer 14, and an encoding processor (channel encoder) 15 subjects the transmit data to encoding processing and outputs the encoded data as in-phase component data. A control signal generator 16 outputs control data, such as a pilot signal, as quadrature-component data at a fixed symbol speed. A QPSK spreader 17 subjects the entered in-phase component (I-channel component) and quadrature-phase component (Q-channel component) to spread-spectrum modulation using a prescribed spreading code, converts the digital modulated signals to analog signals and inputs the analog signals to a QPSK quadrature modulator 18. The latter subjects the I-channel and Q-channel signals to QPSK quadrature modulation, and a radio transmitter 19 frequency-converts (IF→RF) the baseband signal from the quadrature modulator 18 to a high-frequency signal, performs high-frequency amplification and transmits the amplified signal from an antenna $ANT_T$.

FIG. 18 is a diagram useful in describing the frame format of an upstream signal from a mobile station to a base station. One frame has a length of 10 ms and is composed of 15 slots $S_0$ to $S1_4$. User data is mapped to the I channel of QPSK modulation and control data is mapped to the Q channel of QPSK modulation. The number n of bits in each slot in the I channel for user data varies in dependence upon symbol speed. Each slot in the Q channel for control data is composed of ten bits and the symbol speed is a constant 15 Kbps.

FIG. 19 is a diagram useful in describing the frame format and slot arrangement of a downstream signal from a base station to a mobile station. One frame has a length of 10 ms and is composed of 15 slots $S_0$ to $S_{14}$. Each slot contains a mixture of user data Data 1, Data 2 and control data TPC, TFCI, PILOT. The data in each slot is distributed in turns to the I channel and Q channel of QPSK quadrature modulation one bit at a time, after which spread-spectrum modulation and quadrature modulation is applied, frequency conversion is carried out and the resultant signal is transmitted to the mobile station.

Encoding Processing According to the Prior Art

In order to apply channel coding to continuous data sent from terminal equipment TE or the like at the time of transmission in the conventional mobile radio unit described above, it is required that the continuous data be delimited into prescribed processing units (10-ms intervals or the like) and subjected to channel coding in the prescribed units of processing. For example, if 64-Kbps data is delimited in increments of 10 ms and encoding processing is applied every 640 bits, operation will be as shown in FIG. 20. Specifically, the terminal equipment TE sends data continuously but the mobile radio unit delimits the input data into units of processing (10-ms increments) and applies channel coding to data that has been delimited in 10-ms increments.

In this case, as shown in FIG. 21, the speed of data sent from the terminal equipment TE and processing speed on the encoding side generally have different clocks. In a mobile radio unit, speed up to the writing of data to the transmit buffer 14 depends upon speed on the side of the terminal equipment TE, but speed following the read-out of data from the transmit buffer 14 and the application of encoding processing is made high in order to minimize processing delay. If voice is taken as an example, the problem of echo occurs when the processing delay is too long. Accordingly, encoding processing is executed at high speed to minimize processing delay up to the wireless transmission of the voice data. In the case shown in FIG. 21, data is input from the terminal equipment TE at a bit rate of 64 Kbps, and the encoding processor 15 reads the data from the transmit buffer 14 at a frequency of 20 MHz and encodes the data.

Two-bank System

In the case of continuous data (see FIG. 20), a two-bank system is available as a method of implementing the processing of continuous data. The two-bank system involves (1) constructing the buffer 14 from two banks, as shown in FIG. 22; (2) writing data alternately to a bank (BANK 1) $14_1$ on the write side and to a bank (BANK 2) $14_2$ on the read side at 10-ms time intervals (see FIG. 23); and (3) writing data to one bank and reading data out of the other bank simultaneously. In accordance with the two-bank system, encoding processing can be executed while data continuity is maintained.

Decoding Processing when Multiple Items of Terminal Equipment TE are Connected

There are instances where multiple items of terminal equipment TE are connected to a mobile radio unit (see FIG. 17). Even if multiple items of terminal equipment TE are connected, however, it is unnecessary in the prior art to provide a transmit buffer separately for each individual item of terminal equipment TE; the transmit buffer is shared by the terminal equipment. The reason for this is that the conventional mobile unit does not perform communication using multiple items of terminal equipment TE simultaneously. This means that it will suffice to provide, as the transmit and receive buffers, memories having a capacity conforming to the terminal equipment TE having the highest transmission speed. FIG. 24 illustrates a prior-art arrangement that shares the transmit buffer 14. In FIG. 24, terminals TE1, TE2, TE3 and TE4 send 640-, 9600-, 128- and 256-bit data, respectively, every 10 ms. These terminals, however, are not utilized simultaneously. Accordingly, the transmit buffer 14 provided is a 9600-bit buffer conforming to the terminal equipment TE of maximum speed. When the other items of terminal equipment (other services) are activated, the transmit buffer 14 is shared.

In accordance with a scheme proposed by a standardization project 3GPP ($3^{rd}$ Generation Partnership Project) for next-generation W-CDMA, it is necessary to so arrange it that data can be sent and received upon executing encoding processing at arbitrary time intervals of 10 ms, 20 ms, 40 ms and 80 ms. It is also necessary to so arrange it that multiple services can be connected simultaneously. To accomplish this, the arrangement of FIG. 24 cannot be utilized. If a buffer is provided for every item of terminal equipment, on the other hand, a very large number of memories will be required. The problems encountered in realizing the scheme proposed by the 3GPP will be discussed centering on the transmitting side. In the description that follows, it will be assumed that the speeds of the terminals are identical.

Viterbi code or turbo code used in error correction is such that the larger the number of encoded bits, the more error correction capability can be improved. In channel coding proposed as by the 3GPP, therefore, data for which improved error correction is sought requires that encoding processing be executed in time-length units of 20 ms, 40 ms and 80 ms. FIG. 25 shows an example in which user data sent from terminal equipment TE is input to the encoding processor 15 in amounts of 40 ms each.

Further, with channel coding proposed by the 3GPP, etc., it is possible to connect multiple terminals TE1, TE2, TE3, TE4 . . . simultaneously and it is necessary to take a multiplex buffer into consideration from the viewpoint of service. However, if buffers $14_{11}$, $14_{12}$, $14_{13}$, $14_{14}$, . . . are provided for respective ones of the terminals TE1, TE2, TE3, TE4 . . . , a large number of memories will be required. With this arrangement, moreover, it is necessary to increase the number of transmit buffers whenever an item of terminal equipment TE is added on. Such a memory configuration has no flexibility. For this reason, consideration has been given to constructing the transmit buffer 14 physically from a single memory and allowing the each of the terminals TE to use the memory vacancies the required number at a time, thereby enabling the capacity of the memory to be reduced. To achieve this, it is necessary to (1) manage free space of the memory, (2) assign free space to a terminal as required and (3) control data read/write on a per-terminal basis.

FIG. 27 illustrates an example in which such read/write control is implemented. Here a processor 21 manages the free space of transmit buffer 14, designates the write addresses of data from the terminals TE1, TE2, TE3 . . . in a hard macro 22 for data write, and designates read addresses in an encoding hard macro (hard macro for data read) 23. In accordance with these designations, the hard macro 22 writes the service data of each terminal to the designated area of the transmit buffer 14 and the encoding hard macro 23 reads the data of each terminal out of the designated area of transmit buffer 14 and inputs the data to the encoding processor 15.

In the arrangement of FIG. 27, the operations for writing data to the transmit buffer 14 and for reading data out of the transmit buffer 14 are implemented by the hard macros 22, 23 in order to alleviate the load on the processor 21. It is required that the spaces written and read by the hard macros 22, 23 at such time be continuous. The reason for this is as follows, taking the read operation as an example: The hard macro 23 does not possess an intelligent function; it has only a function for reading out data continuously upon designating (1) the starting read-out address and number of items of data to be read out or (2) the starting read-out address and the final read-out address. Similarly, on the write side, it is necessary to so arrange it that data will be written to continuous space.

However, there are instances where a service provided by a terminal is added on or deleted at the volition of the user. FIG. 28 is a diagram useful in describing the status of a buffer, which depends upon the addition/deletion of services. As shown in (A) of FIG. 28, data of services 1, 2, 3 provided by terminals TE1, TE2, TE3 is stored in areas $14_{11}$, $14_{12}$, $14_{13}$, respectively, of the buffer 14 and is processed at the required time intervals. If service 2 is deleted at a certain time under these conditions, as by detaching terminal TE2 from its adapter, a hole is produced in the content of the buffer 14, as shown in (B) of FIG. 28. Consider a case where a new service 4 is added on in the presence of such a hole, as illustrated in (C) of FIG. 28. Though the buffer 14 has enough free space to store the data of the new service 4, there is no space for physically buffering data continuously. Consequently, it is necessary to split the data of service 4 into two spaces and then write the data to the buffer. As mentioned above, however, it is not possible for the hard macro 22 to write data to areas that are discontinuous. Even if the data is written, moreover, the encoding hard macro 23 cannot read out data unless the data is contained in space that is continuous. This means that writing the data in the first place is meaningless. In other words, with the arrangement shown in FIG. 27, the problem which arises is that there are situations where the adding on of new services cannot be supported.

Further, with management that assigns an area of the minimum necessary size to each service, as shown in FIG. 27, a problem which arises is a complicated bank switching operation. For example, assume that terminal TE1 executes a service for which the length of encoding time is 40 ms, terminal TE2 a service for which the length of encoding time is 10 ms and terminal TE3 a service for which the length of encoding time is 20 ms. In such case it will be necessary to design the hard macros 22, 23 in such a manner that bank switching can be carried out at the respective time intervals, as depicted in FIG. 29. When addition/deletion of a service is taken into consideration, the hard macros 22, 23 must be so adapted that bank switching can be performed at any timing. This cannot be achieved with a simple arrangement. Further, if service addition/deletion occurs, as shown in FIG. 28, it is necessary to perform address management in such a manner that will not impede the switching of each bank and that will not cause holes to appear in the buffer memory. The problem that arises is complicated address management.

Thus, in a case where a single memory contains a mixture of data representing services for which the lengths of encoding time are 10 ms, 20 ms, 40 ms and 80 ms, etc., bank switching and address management become complex and so does the structure of the hard macros, meaning that the original advantages of the hard macros are lost.

In light of the problems set forth above, arrangements will be described in which address management and bank switching can be performed in simple fashion in a case where a plurality of terminals that provide services for which the lengths of encoding time are 10 ms, 20 ms, 40 ms and 80 ms are connected.

FIG. 30 illustrates a first example of such an arrangement. This shows an example (of one bank's worth of memory) in which services S1 to S8 of respective terminals are provided with enough memory for the maximum length of encoding time (=80 ms). If the maximum bit rate from each of the terminals TE1 to TE8 is 64 Kbps, 640×8 bits of memory are provided for each of the services S1 to S8. In accordance with such an arrangement, no problem whatsoever arises even in a case where the services S1 to S8 are encoded at arbitrary lengths of encoding time. Further, support is possible without any problem even in terms of addition/deletion of services.

FIG. 31 illustrates a second example of such an arrangement. This shows an example in which two bank's worth of memory are provided, each memory bank storing 80, 40, 20 and 10 millisecond's worth of data, in terms of lengths of encoding time, for the respective services S1 to S4. One bank has 640×8 bits of memory for service S1, 640×4 bits of memory for service S2, 640×2 bits of memory for service S3 and 640×1 bits of memory for service S4. In accordance with this arrangement, memory is constructed for per length of encoding time. As a result, data having different lengths of encoding time is not mixed in one memory and both address management and bank switching can be performed in simple fashion.

Since the first memory arrangement of FIG. 30 necessitates two bank's worth of memory, the total amount of memory required is (amount of data for 80 ms)×(number of services)×(number of banks). The result is a very large memory capacity. Such a memory arrangement is not suited to a mobile radio station that requires small size and low cost.

With the second memory arrangement of FIG. 31, the amount of memory can be reduced over that of the first memory arrangement. Since two bank's worth of memory is required, however, the memory reducing effect is unsatisfactory. Further, with the second memory arrangement, two or more services for each of which the length of encoding time is 80 ms cannot be connected, and neither can three or more services for each which the length of encoding time is 40 ms.

The foregoing has been described centering on the construction of the transmit buffer. However, the same problems hold true for the receive buffer as well.

SUMMARY OF THE INVENTION

Accordingly, an object of the present invention is to so arrange it that data having different lengths of encoding time will not be mixed in a buffer memory, address management and bank switching can be performed in simple fashion and the amount of necessary memory can be reduced.

Another object of the present invention is to so arrange it that a service having any length of encoding time can be connected using a small amount of memory.

A first aspect of the present invention relates to a transmitting apparatus for storing transmit data, which relates to respective ones of N-number of $1^{st}$ to $N^{th}$ services, in lengths equivalent to a multiple $n_i$ (i=1, 2, ..., N) of a reference time length T, reading out the stored transmit data $n_i \cdot T$ at a time, encoding each read item of transmit data of length $n_i \cdot T$, and transmitting the encoded data. The transmitting apparatus comprises: (1) a transmit buffer having a first storage unit for storing, on a per-service basis, transmit data of length $n_i \cdot T$, and a second storage unit for storing, on a per-service basis, transmit data of the reference time length T; (2) an encoding processor for encoding and then outputting transmit data of each service of length $n_i \cdot T$ (i=1, 2, ..., N); (3) a controller which, on a per-service basis, stores the transmit data of length $n_i \cdot T$ in the transmit buffer continuously, reference time length T at a time, at low speed; then, after storage of this data, reads already stored transmit data of length $n_i \cdot T$ out of the transmit buffer at high speed in parallel with storage of succeeding transmit data of reference time length T in the transmit buffer; then subsequently performs, in parallel fashion, low-speed continuous storage of transmit data of length $n_i \cdot T$ and high-speed intermittent read-out of already stored transmit data of length $n_i \cdot T$; and inputs, to the encoding processor, the transmit data that has been read out; (4) a multiplexer for multiplexing data obtained by the encoding processing of transmit data of length $n_i \cdot T$ of each service; and (5) a transmitter for transmitting the multiplexed data.

A second aspect of the present invention relates to a receiving apparatus for demultiplexing encoded data of N-number of $1^{st}$ to $N^{th}$ services that have been multiplexed and sent to the receiving apparatus, decoding demultiplexed encoded data of each $i^{th}$ service (i=1, 2, ..., N), storing the decoded data for lengths of time that are a multiple $n_i$ (i=1, 2, ..., N) of a reference time length T, reading out stored transmit data $n_1 \cdot T$ at a time, transmitting the data to a terminal, and performing, in parallel, storage and read-out of decoded data on a per-service basis. The receiving apparatus comprises: (1) a demultiplexer for demultiplexing encoded data of N-number of services from received data; (2) a decoding processor for decoding original data of length $n_i \cdot T$ from encoded data of each service; (3) a receive buffer having a first storage unit for storing, on a per-service basis, decoded data of length $n_i \cdot T$, and a second storage unit for storing, on a per-service basis, decoded data of the reference time length T; and (4) a controller which, on a per-service basis, intermittently stores decoded data of length $n_i \cdot T$ in the receive buffer at high speed; of the stored decoded data of length $n_i \cdot T$, reads out decoded data of length $(n_i-1) \cdot T$ continuously, reference time length T at a time, at low speed; stores succeeding transmit data of length $n_i \cdot T$ in the receive buffer at high speed in parallel with read-out of final decoded data of reference time length T; then subsequently performs, in parallel fashion, low-speed continuous read-out of transmit data of length $n_i \cdot T$ and high-speed intermittent storage of transmit data of length $n_i \cdot T$.

In accordance with the transmitting apparatus and receiving apparatus according to the present invention, it suffices merely to provide, as a second bank, a storage area of small capacity for storing, for each service, data of the reference length of time T. This makes it possible to reduce the overall amount of memory. Further, since the buffer memory does not store a mixture of data having different lengths of encoding time, address management and bank switching can be performed in simple fashion. Further, if an arrangement is adopted in which transmit data of the maximum length of encoding time is stored, on a per-service basis, in the first storage unit serving as the first bank, a service having any length of encoding type can be connected using an amount of memory that is comparatively small.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram illustrating the memory structure of a receive buffer;

FIG. 5 is a timing chart of timing on the receiving side;

FIG. 29 illustrate bank switching at time intervals according to the prior art;

FIG. 30 illustrates an arrangement in which a maximum of 80 millisecond's worth of memory is provided along the time axis for every service according to the prior art.

DESCRIPTION OF THE PREFERRED EMBODIMENTS (A) Overview of the Present Invention (a) Transmit Buffer FIG. 1 is a diagram illustrating the memory structure of a transmit buffer in a transmitting apparatus according to the present invention. This illustrates a case where four services S1, S2, S3, S4 (terminals TE1, TE2, TE3, TE4) of lengths of encoding time 80 ms, 40 ms, 20 ms and 10 ms, respectively, are connected to the apparatus. (1) Eight storage areas A11 to A81 in a first bank are assigned at increments of 10 ms to the service S1 the length of encoding time of which is 80 ms, and one 10-ms storage area B11 in a second bank is assigned to the service S1. (2) Four storage areas A12 to A42 in the first bank are assigned at increments of 10 ms to the service S2 the length of encoding time of which is 40 ms, and one 10-ms storage area B12 in the second bank is assigned to the service S2. (3) Two storage areas A13, A23 in the first bank are assigned at increments of 10 ms to the service S3 the length of encoding time of which is 20 ms, and one 10-ms storage area B13 in the second bank is assigned to the service S3. (4) One storage area A14 in the first bank is assigned to the service S4 the length of encoding time of which is 10 ms, and one 10-ms storage area B14 in the second bank is assigned to the service S4.

Figure 1:
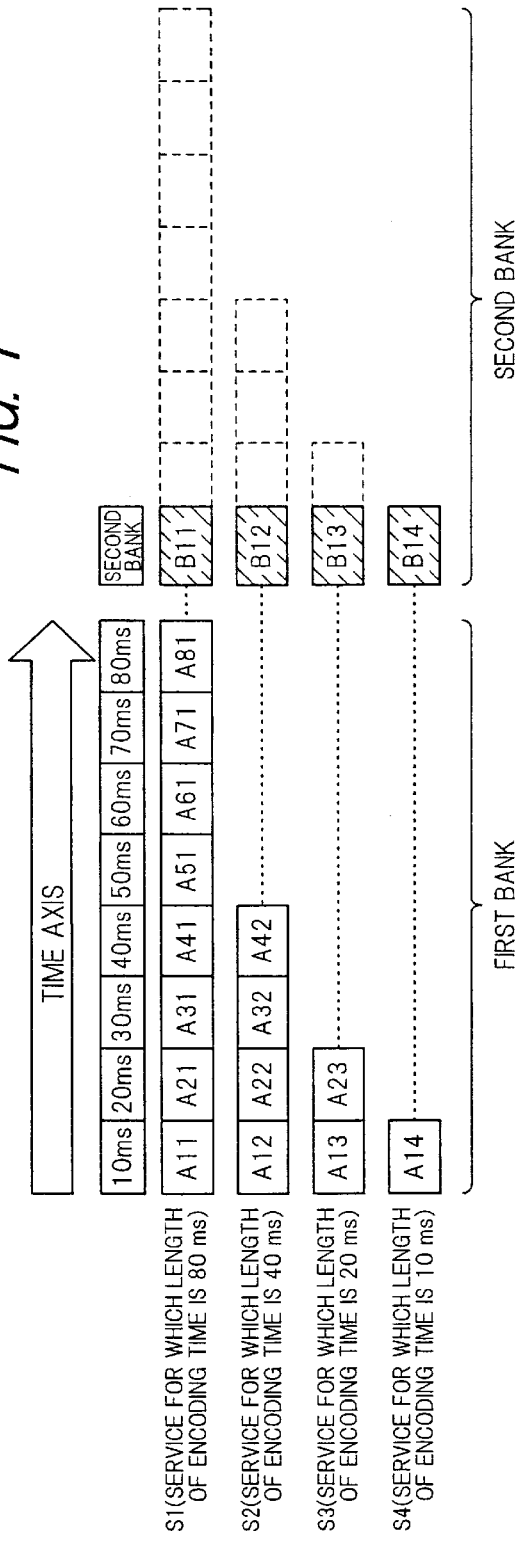
FIG. 1 is a diagram illustrating the memory structure of a transmit buffer.
Figure 31:
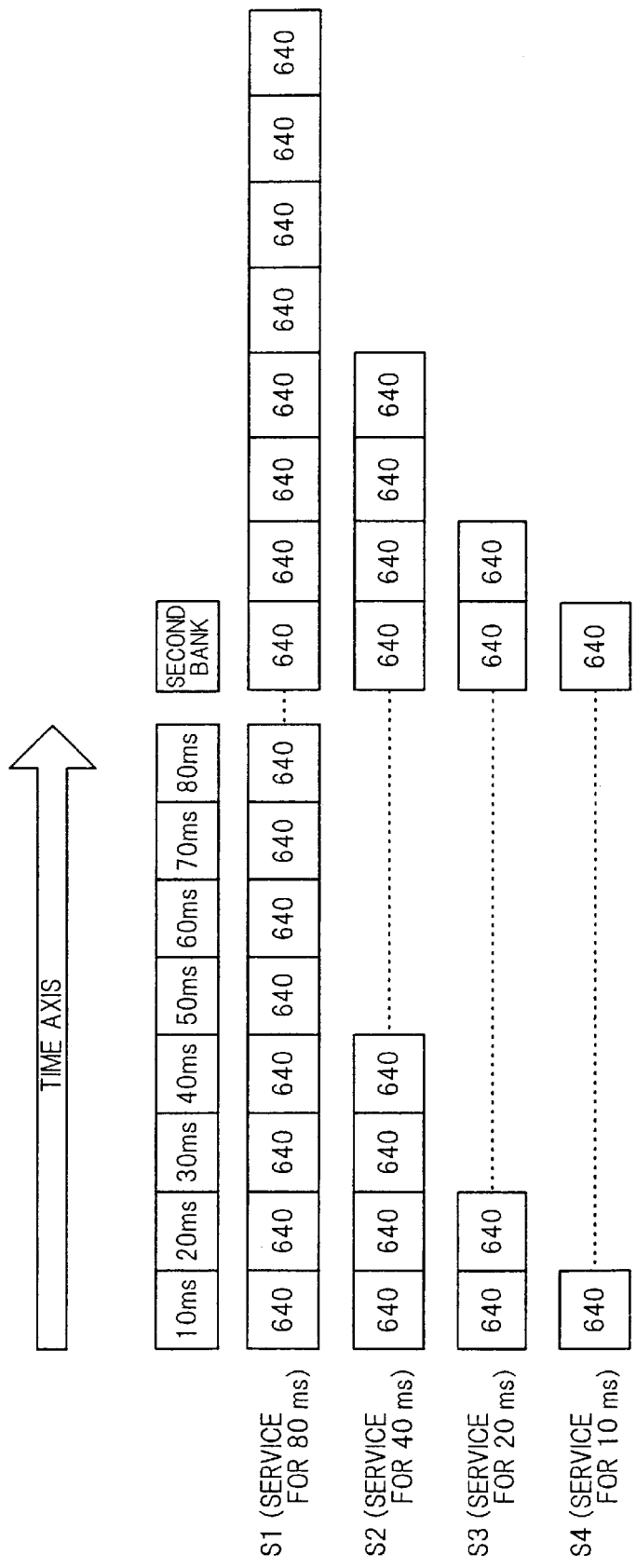
FIG. 31 illustrates a memory structure in which 640 bit's worth of memory is provided every 10 ms for services of 80 ms, 40 ms, 20 ms and 10 ms.

With the already proposed memory structure (FIG. 31), the second bank of memory is provided in an amount equivalent to length of encoding time. According to the present invention, however, only ten millisecond's worth is provided, thereby reducing the amount of memory. More specifically, memory in an amount indicated by the dashed lines in FIG. 1 can be reduced in comparison with FIG. 31. The overall amount of memory used is $^{19}\!/\!_{30}$ of that in the memory structure of FIG. 31.

Figure 2:
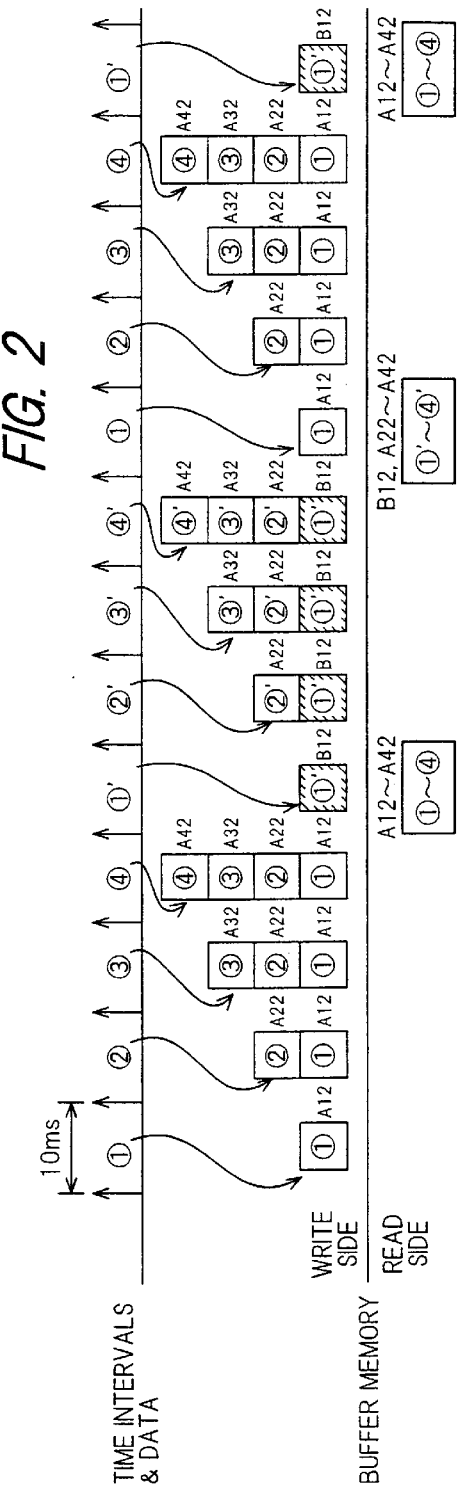
FIG. 2 is a timing chart of timing on the transmitting side.

FIG. 2 is a timing chart in which the operation for writing transmit data to a buffer memory (first and second banks) and reading data out of the buffer memory is expressed in a time series in regard to a service for which the length of encoding time is 40 ms. In order to implement control for writing/reading 40 millisecond's worth of transmit data for which the length of encoding time is 40 ms to and from the first and second banks in turn using the small memory structure of FIG. 1, transmit data that has been written on the write side in order 10 ms at a time and over a period of 40 ms is read out in a single burst over a period of 10 ms on the read-out side.

More specifically, (1) a length of 40 ms (=4×10 ms) of transmit data ① to ④ is written successively in increments of 10 ms to the first to fourth storage areas A12 to A42 of the first bank, and (2) of succeeding transmit data ①' to ④' of length 40 ms (=4×10 ms), the initial transmit data ①' of length 10 ms is written to the storage area B12 of the second bank and the remaining transmit data ②' to ④' of length 30 ms is written successively in increments of 10 ms to the second to fourth storage areas A22–A42 of the first bank. (3) The write processing of (1), (2) described above is repeated to write transmit data to the first and second banks. The transmit data is read out in parallel with the write processing described above. Specifically, (4) when the transmit data ①' of length 10 ms is being written to the storage area B12 of the second bank in the write processing of (2) described above, the transmit data ① to ④ of length 40 ms that was written to the first to fourth storage areas A12 to A42 of the first bank is read out at high speed and is input to an encoding processor, and (5) when the transmit data ① of length 10 ms is being written to the storage area A12 of the first bank in the write processing of (1) described above, the transmit data ①' to ④' of length 40 ms that was written to the storage area B12 of the second bank and to the second to fourth storage areas A22 to A42 of the first bank is read out at high speed and is input to the encoding processor. (6) The read-out processing of (4), (5) described above is repeated to read transmit data out of the first and second banks and input the data to the encoding processor.

Figure 3:
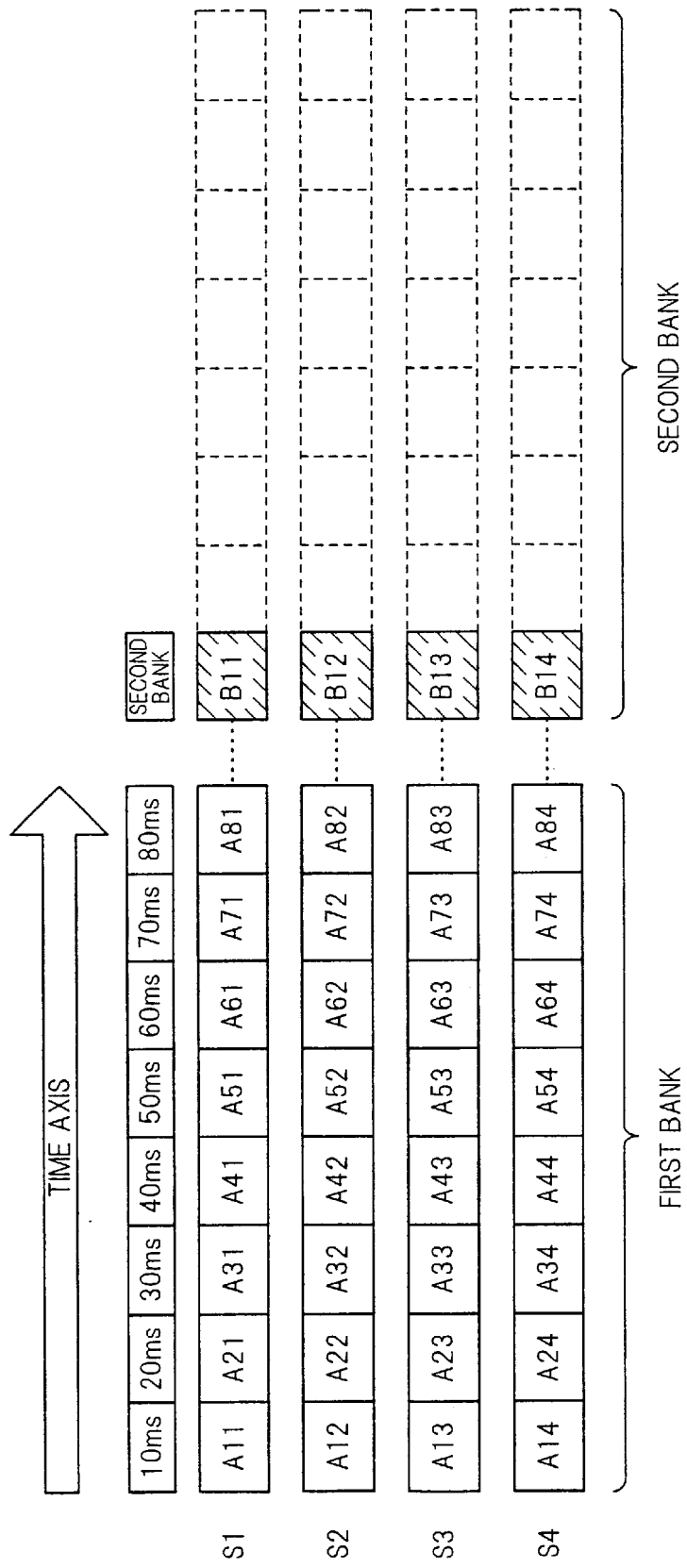
FIG. 3 is a diagram illustrating another memory structure of a transmit buffer.

FIG. 3 is a diagram illustrating another memory structure of a transmit buffer. The first bank shown in FIG. 1 has a storage capacity for storing 80, 40, 20 and 10 millisecond's worth of data in terms of these lengths of encoding times for respective ones of services S1, S2, S3 and S4. With the memory structure of FIG. 1, therefore, two or more services for which the length of encoding time is 80 ms cannot be connected, nor can three or more services for which the length of encoding time is 40 ms. With the memory structure of FIG. 3, however, there is enough storage capacity for storing data for which the length of encoding time is 80 ms for each of the services S1, S2, S3 and S4. This means that the services S1 to S4 may have any lengths of encoding time. For example, if the length of encoding time of service S3 is 40 ms, then the buffering of transmit data is carried out using storage areas A13 to A43 of the first bank and storage area B13 of the second bank.

(b) Receive Buffer

FIG. 4 is a diagram illustrating the memory structure of a receive buffer in a receiving apparatus according to the present invention. This illustrates a case where four services S1, S2, S3, S4 (terminals TE1, TE2, TE3, TE4) of lengths of encoding time 80 ms, 40 ms, 20 ms and 10 ms, respectively, are connected to the apparatus. (1) Eight storage areas A11 to A81 in a first bank are assigned at increments of 10 ms to a service S1 the length of encoding time of which is 80 ms, and one 10-ms storage area B81 in a second bank is assigned to the service S1. (2) Four storage areas A12 to A42 in the first bank are assigned at increments of 10 ms to a service S2 the length of encoding time of which is 40 ms, and one 10-ms storage area B42 in the second bank is assigned to the service S2. (3) Two storage areas A13, A23 in the first bank are assigned at increments of 10 ms to a service S3 the length of encoding time of which is 20 ms, and one 10-ms storage area B23 in the second bank is assigned to the service S3. (4) One storage area A14 in the first bank is assigned to a service S4 the length of encoding time of which is 10 ms, and one 10-ms storage area B14 in the second bank is assigned to the service S4.

FIG. 5 is a timing chart in which the operation for writing decoded data, which has been obtained by decoding, to a buffer memory (first and second banks) and reading data out of the buffer memory and sending it to a terminal is expressed in a time series in regard to a service for which the length of encoding time is 40 ms. In order to implement control for writing/reading 40 millisecond's worth of decoded data to and from the first and second banks in turn using the small memory structure of FIG. 4, the present invention is such that 40 millisecond's worth of decoded data is written in a single burst over a period of 10 ms and, on the read-out side, the decoded data is read out successively 10 ms at a time over a period of 40 ms.

More specifically, (1) a length of 40 ms (=4×10 ms) of decoded data ① to ④ is written at high speed in burst fashion to the first to fourth storage areas A12 to A42 of the first bank, after which the decoded data ① to ③ is read out of the first to third storage areas A12 to A32 of the first bank 10 ms at a time at low speed; (2) succeeding decoded data ①' to ④' of length 40 ms is written at high speed in burst fashion to the first to third storage areas A12 to A32 of the second bank and to storage area B42 of the second bank in parallel with read-out of the final decoded data ④ of length 10 ms from the fourth storage area A42 of the first bank, after which the decoded data ①' to ③' is read out of the first to third storage areas A12 to A32 of the first bank 10 ms at a time at low speed; and (3) succeeding decoded data ① to ④ of length 40 ms is written at high speed in burst fashion to the first to fourth storage areas A12 to A42 of the first bank in parallel with read-out of the final coded data ④' of length 10 ms from the storage area B42 of the second bank, after which the decoded data ① to ③ is read out of the first to third storage areas A12 to A32 of the first bank 10 ms at a time at low speed. The write and read processing of (2), (3) above is subsequently repeated to write transmit data to the first and second banks and to read the data out of the first and second banks.

(B) Mobile Station

Figure 6:
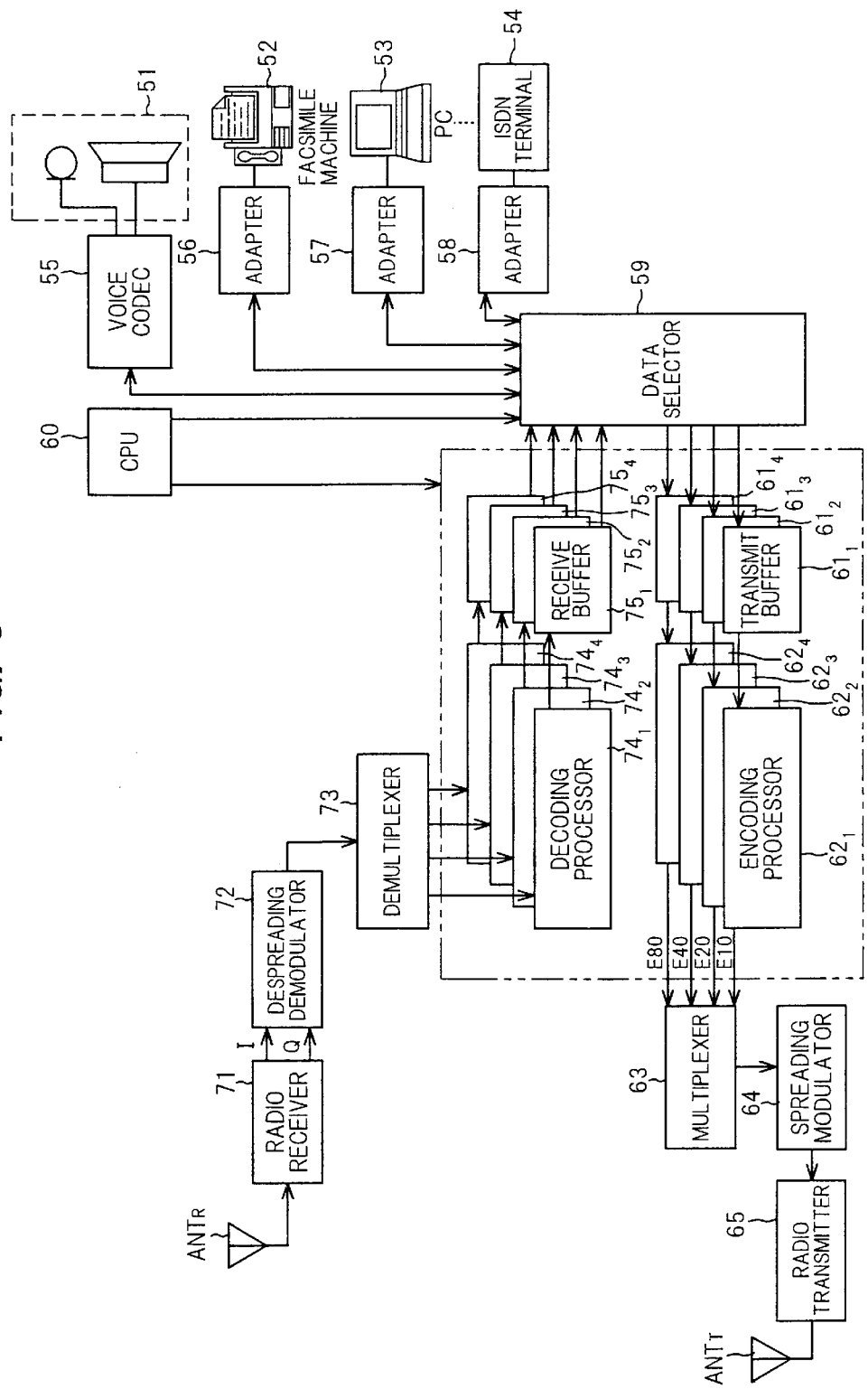
FIG. 6 is a block diagram of a mobile station according to the present invention.

FIG. 6 is a block diagram of a mobile station according to the present invention. It should be noted that although antennae and the like are provided individually for the transmitting and receiving sides, such equipment can be shared by both sides.

When transmission is performed, data sent from terminals 51 to 54 enters a data selector 59 via a voice codec 55 and adapters 56 to 58. By way of example, the terminals 51 to 54 are a mobile telephone, a facsimile machine, a personal computer and an ISDN terminal, respectively, which are registered with a processor 60 as having lengths of encoding time of 10 ms, 20 ms, 40 ms and 80 ms, respectively. In accordance with a command from the processor 60, the data selector 59 selectively inputs transmit data, which enters from each of the terminals 51 to 54 via a voice codec and adapters, etc., to transmit buffers $61_1$, $61_2$, $61_3$, $61_4$ the lengths of encoding time of which are 10 ms, 20 ms, 40 ms and 80 ms, respectively. For example, transmit data from terminal 51, which executes a service whose length of encoding time is 10 ms, is input to the transmit buffer $61_1$ whose length of encoding time is 10 ms; transmit data from terminal 52, which executes a service whose length of encoding time is 20 ms, is input to the transmit buffer $61_2$ whose length of encoding time is 20 ms; transmit data from terminal 53, which executes a service whose length of encoding time is 40 ms, is input to the transmit buffer $61_3$ whose length of encoding time is 40 ms; and transmit data from terminal 54, which executes a service whose length of encoding time is 80 ms, is input to the transmit buffer $61_4$ whose length of encoding time is 80 ms.

In accordance with the method described in conjunction with FIG. 2, the transmit buffers $61_1$, $61_2$, $61_3$ and $61_4$ write transmit data to buffer memories continuously at low speed every 10 ms, read out the transmit data in a single burst every 10 ms, 20 ms, 40 ms and 80 ms and input the read data to encoding processors $62_1$, $62_2$, $62_3$ and $62_4$, respectively, that constitute the next stage.

Figure 7:
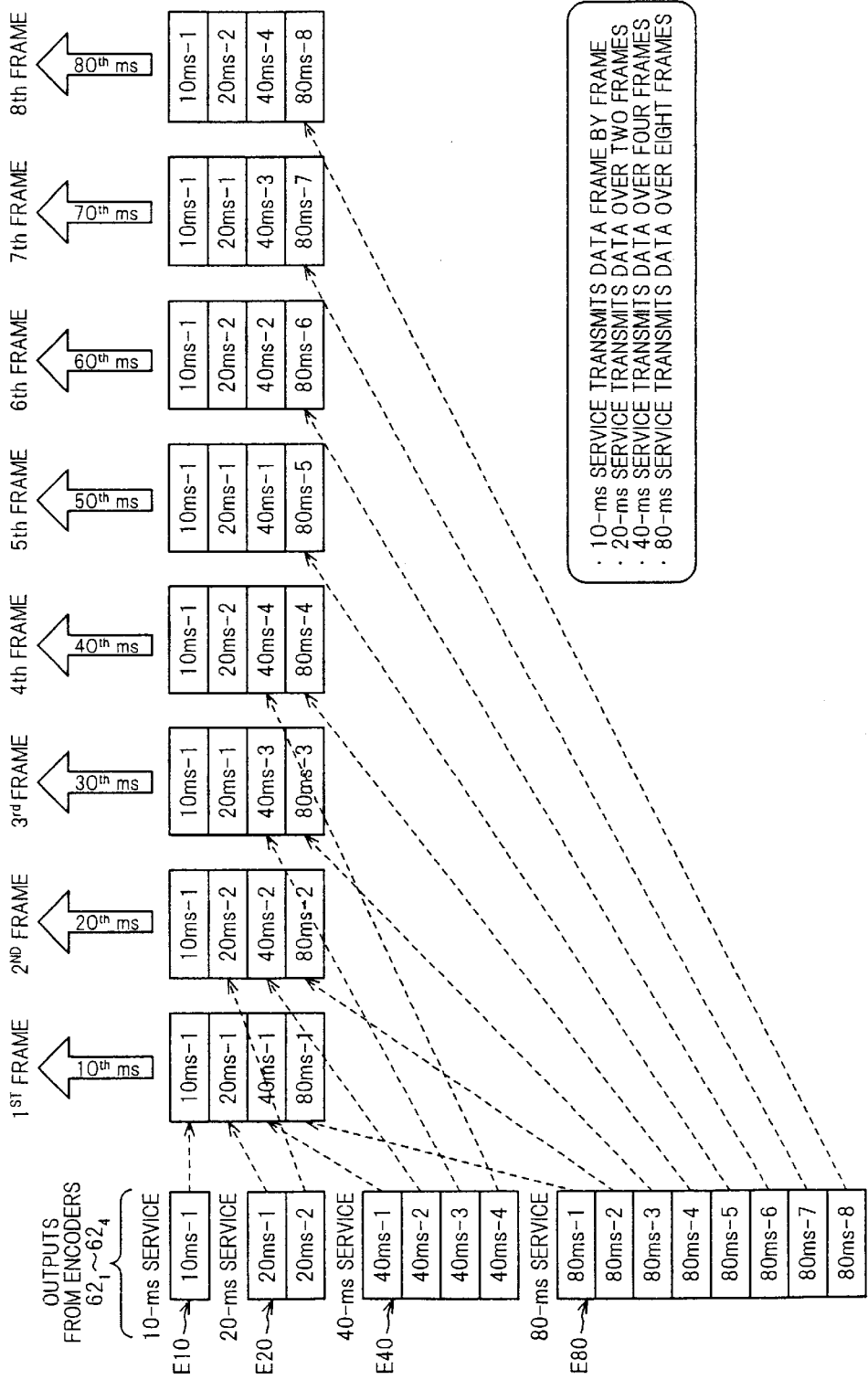
FIG. 7 is a diagram useful in describing a multiplexing method.

The encoding processors $62_1$, $62_2$, $62_3$ and $62_4$ encode the transmit data of lengths 10 ms, 20 ms, 40 ms and 80 ms, respectively, in accordance with a Viterbi code or turbo code and input the encoded data to a multiplexer 63. More specifically, the encoding processor $62_1$ outputs encoded data E10 of length 10 ms, the encoding processor $62_2$ outputs encoded data E20 of length 20 ms, the encoding processor $62_3$ outputs encoded data E40 of length 40 ms and the encoding processor $62_4$ outputs encoded data E80 of length 80 ms. For example, as shown in FIG. 7, the encoding processor $62_1$ outputs encoded data 10 ms-1 every 10 ms, the encoding processor $62_2$ outputs a first half 20 ms-1 and a second half 20 ms-2 of the encoded data E20 in order every 10 ms, the encoding processor $62_3$ outputs fourths 40 ms-1, 40 ms-2, 40 ms-3, 40 ms-4 of the encoded data E40 in order every 10 ms, and the encoding processor $62_4$ outputs eighths 80 ms-1, 80 ms-2, 80 ms-3, 80 ms-4, 80 ms-5, 80 ms-6, 80 ms-7, 80 ms-8 of the encoded data E40 in order every 10 ms.

The multiplexer 63 multiplexes the encoded data that enters from the encoding processors $62_1$–$62_4$ every 10 ms, creates one frame's worth of multiplexed data and transmits the frame. FIG. 7 is a diagram useful in describing the multiplexing method. In the initial tenth millisecond, encoded data {10 ms-1, 20 ms-1, 40 ms-1, 80 ms-1} is multiplexed and transmitted as a first frame. Subsequently, in $20^{th}$ to $80^{th}$ milliseconds, the following multiplexed data is created and transmitted as second to eighth frames:

multiplexed data: {10 ms-1, 20 ms-2, 40 ms-2, 80 ms-2} . . . second frame multiplexed data: {10 ms-1, 20 ms-1, 40 ms-3, 80 ms-3} . . . third frame multiplexed data: {10 ms-1, 20 ms-1, 40 ms-4, 80 ms-4} . . . fourth frame multiplexed data: {10 ms-1, 20 ms-1, 40 ms-1, 80 ms-5} . . . fifth frame multiplexed data: {10 ms-1, 20 ms-2, 40 ms-2, 80 ms-6} . . . sixth frame multiplexed data: {10 ms-1, 20 ms-1, 40 ms-3, 80 ms-7} . . . seventh frame multiplexed data: {10 ms-1, 20 ms-2, 40 ms-4, 80 ms-8} . . . eighth frame That is, for a service whose length of encoding time is 10 ms, the data is transmitted frame by frame; for a service whose length of encoding time is 20 ms, the data is transmitted over two frames; for a service whose length of encoding time is 40 ms, the data is transmitted over four frames; and for a service whose length of encoding time is 80 ms, the data is transmitted over eight frames.

A spreading modulator 64 spread-spectrum modulates the multiplexed frame data using a prescribed spreading code, subjects the data to a digital-to-analog conversion, subsequently applies quadrature modulation and inputs the result to a radio transmitter 65. The latter converts the quadrature-modulated signal to a high-frequency signal by a frequency conversion (IF→RF), applies high-frequency amplification and transmits the resultant signal from an antenna $ANT_T$.

Figure 8:
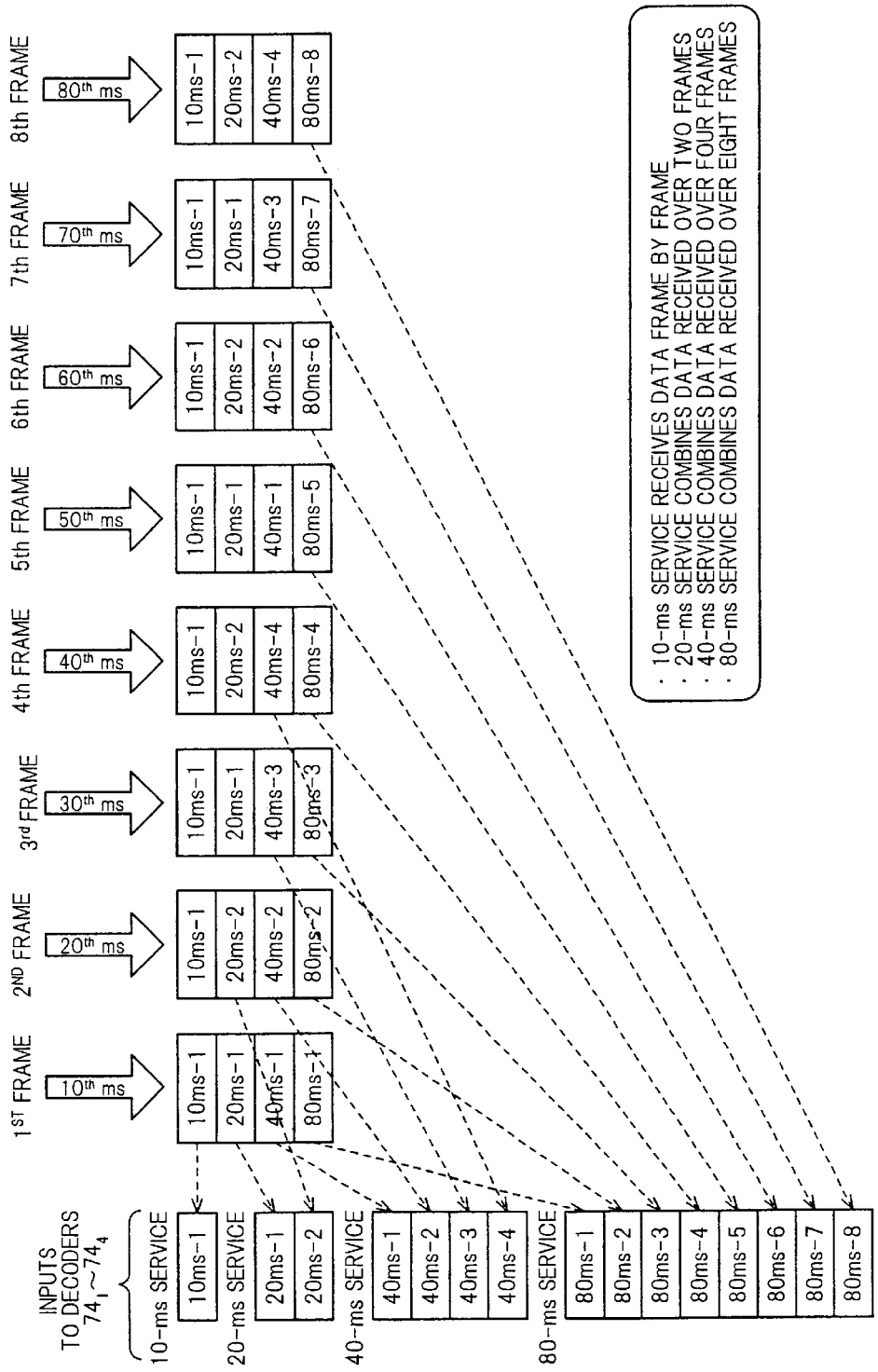
FIG. 8 is a diagram useful in describing a demultiplexing method.

When reception is performed, a radio receiver 71 subjects a high-frequency signal received from an antenna $ATN_R$ to a frequency conversion (RF→IF conversion) to obtain a baseband signal, subsequently subjects the baseband signal to quadrature detection to generate in-phase component (I component) data and quadrature component (Q component) data, applies an analog-to-digital conversion and inputs the resultant signals to a despreading demodulator 72. The latter applies despread processing to the I- and Q-component signals using the same spreading code, demodulates (synchronously detects) the transmitted encoded data and inputs the data to a demultiplexer 73. As shown in FIG. 8, the following encoded data that has been multiplexed is input to the demultiplexer 73:

multiplexed data: {10 ms-1, 20 ms-1, 40 ms-1, 80 ms-1} . . . first frame multiplexed data: {10 ms-1, 20 ms-2, 40 ms-2, 80 ms-2} . . . second frame multiplexed data: {10 ms-1, 20 ms-1, 40 ms-3, 80 ms-3} . . . third frame multiplexed data: {10 ms-1, 20 ms-2, 40 ms-4, 80 ms-4} . . . fourth frame multiplexed data: {10 ms-1, 20 ms-1, 40 ms-1, 80 ms-5} . . . fifth frame multiplexed data: {10 ms-1, 20 ms-2, 40 ms-2, 80 ms-6} . . . sixth frame multiplexed data: {10 ms-1, 20 ms-1, 40 ms-3, 80 ms-7} . . . seventh frame multiplexed data: {10 ms-1, 20 ms-2, 40 ms-4, 80 ms-8} . . . eighth frame The demultiplexer 73 inputs the initial 10-ms encoded data 10 ms-1 of each frame to a first decoding processor $74_1$, inputs second 20-ms encoded data 20 ms-1, 20 ms-2 to a second decoding processor $74_2$, inputs third 40-ms encoded data 40 ms-1, 40 ms-2, 40 ms-3, 40 ms-4 to a third decoding processor $74_3$, and inputs fourth 80-ms encoded data 80 ms-1, 80 ms-2, 80 ms-3, 80 ms-4, 80 ms-5, 80 ms-6, 80 ms-7, 80 ms-8 to a fourth decoding processor $74_4$. That is, data of the service for which the length of encoding time is 10 ms is received frame by frame, data of the service for which the length of encoding time is 20 ms is received over two frames, data of the service for which the length of encoding time is 40 ms is received over four frames and data of the service for which the length of encoding time is 80 ms is received over eight frames.

The first decoding processor $74_1$, which applies error correction processing to the encoded data of length 10 ms and decodes the original transmit data, decodes the encoded data 10 ms-1 and inputs the decoded data to a receive buffer $75_1$ every 10 ms. The second decoding processor $74_2$, which applies error correction processing to the encoded data of length 20 ms and decodes the original transmit data, decodes the encoded data 20 ms-1, 20 ms-2 and inputs the decoded data to a receive buffer $75_2$ every 20 ms. The third decoding processor $74_3$, which applies error correction processing to the encoded data of length 40 ms and decodes the original transmit data, decodes the encoded data 40 ms-1 to 40 ms-4 and inputs the decoded data to a receive buffer $75_3$ every 40 ms. The fourth decoding processor $74_4$, which applies error correction processing to the encoded data of length 80 ms and decodes the original transmit data, decodes the encoded data 80 ms-1 to 80 ms-8 and inputs the decoded data to a receive buffer $75_4$ every 80 ms.

In accordance with the method described in conjunction with FIG. 5, the receive buffers $75_1$, $75_2$, $75_3$ and $75_4$ write the decoded data to buffer memories in a single burst every 10 ms, 20 ms, 40 ms and 80 ms, read the decoded data out of the buffer memories every 10 ms and input the data to the data selector 59. In accordance with a command from the processor 60, the data selector 59 selectively inputs the decoded data, which enters from each of the receive buffers $75_1$–$75_4$, to terminals 51 to 54. For example, decoded data that enters from the receive buffer $75_1$ for which the length of encoding time is 10 ms is sent to the terminal 51, which executes the service for which the length of encoding time is 10 ms; decoded data that enters from the receive buffer $75_2$ for which the length of encoding time is 20 ms is sent to the terminal 52, which executes the service for which the length of encoding time is 20 ms; decoded data that enters from the receive buffer $75_3$ for which the length of encoding time is 40 ms is sent to the terminal 53, which executes the service for which the length of encoding time is 40 ms; and decoded data that enters from the receive buffer $75_4$ for which the length of encoding time is 80 ms is sent to the terminal 54, which executes the service for which the length of encoding time is 80 ms.

(C) Control for Writing/Reading Data in Each Transmit Buffer

FIGS. 9 to 12 are diagrams useful in describing operation for writing/reading data in the transmit buffers $61_1$ to $61_4$. Components identical with those shown in FIG. 6 are designated by like reference characters.

Figure 9:
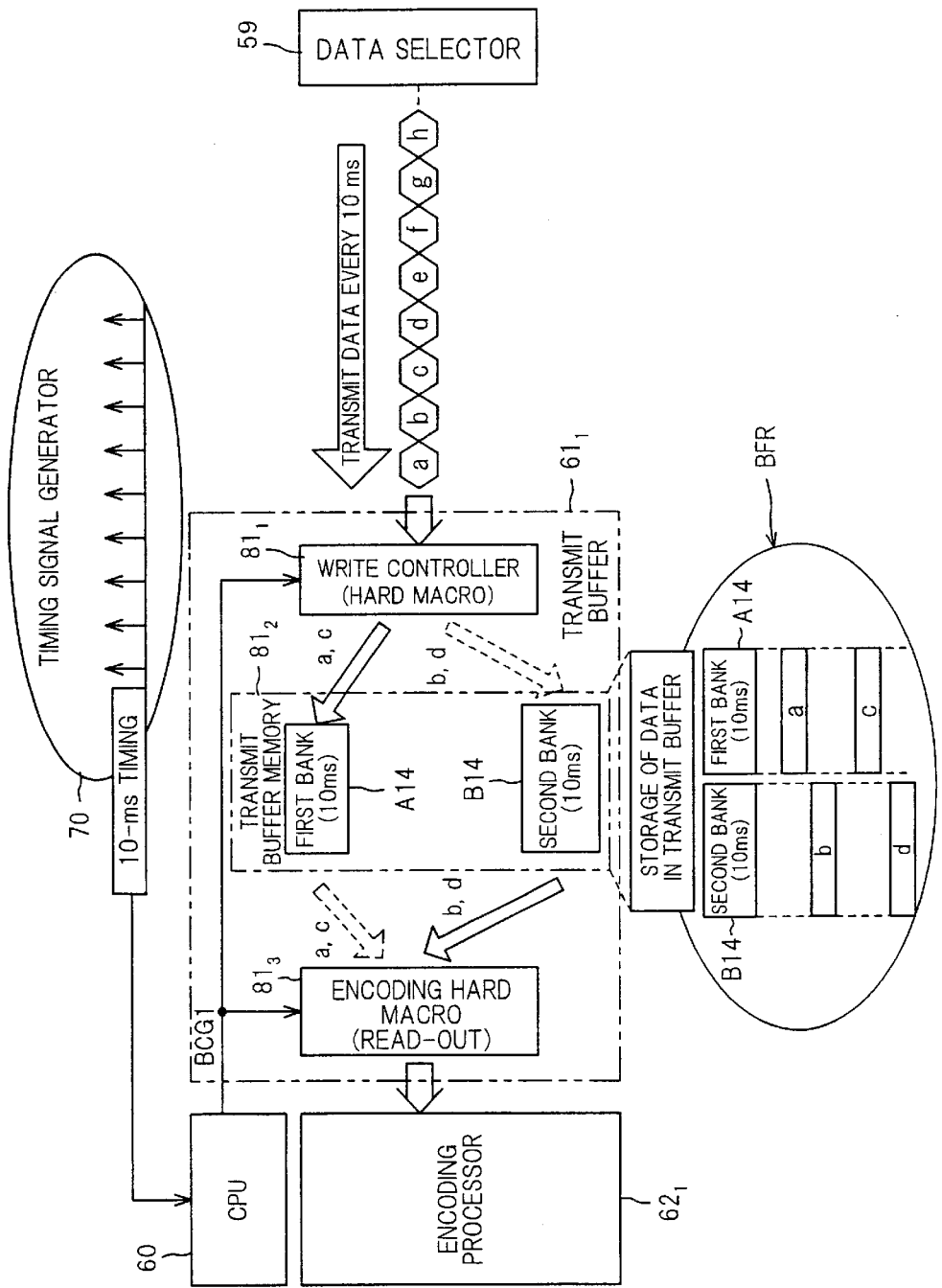
FIG. 9 illustrates an operation for switching the banks of a transmit buffer for 10 ms.

Transmit buffer for 10 ms (FIG. 9)

The processor 60 inputs a bank switching signal BCG1 to the transmit buffer $61_1$, which is for the length of encoding time of 10 ms, based upon a 10-ms timing signal that enters from a timing signal generator 70. In accordance with the bank switching signal BCG1, a write controller (hard macro) $81_1$ in the transmit buffer $61_1$ alternately writes transmit data a, b, c, d, . . . of lengths 10 ms, which enters from the data selector 59, to storage areas A14 and B14 of first and second banks, respectively, in a transmit buffer memory $81_2$, and an encoding hard macro $81_3$ alternately reads 10 millisecond's worth of transmit data, which was written in the preceding cycle, out of the storage areas B14 and A14 of the second and first banks, respectively, in parallel with the write operation and inputs the data to the encoding processor $62_1$. In other words, as indicated at BFR in FIG. 9, transmit data a, b, c, d, . . . is alternately written to the storage areas A14, B14, the writing of the transmit data b to the storage area B14 and the read-out of the transmit data a from the storage area A14 are performed in parallel, the writing of the transmit data c to the storage area A14 and the read-out of the transmit data b from the storage area B14 are performed in parallel, and so on, with such write/read control proceeding in similar fashion.

Figure 10:
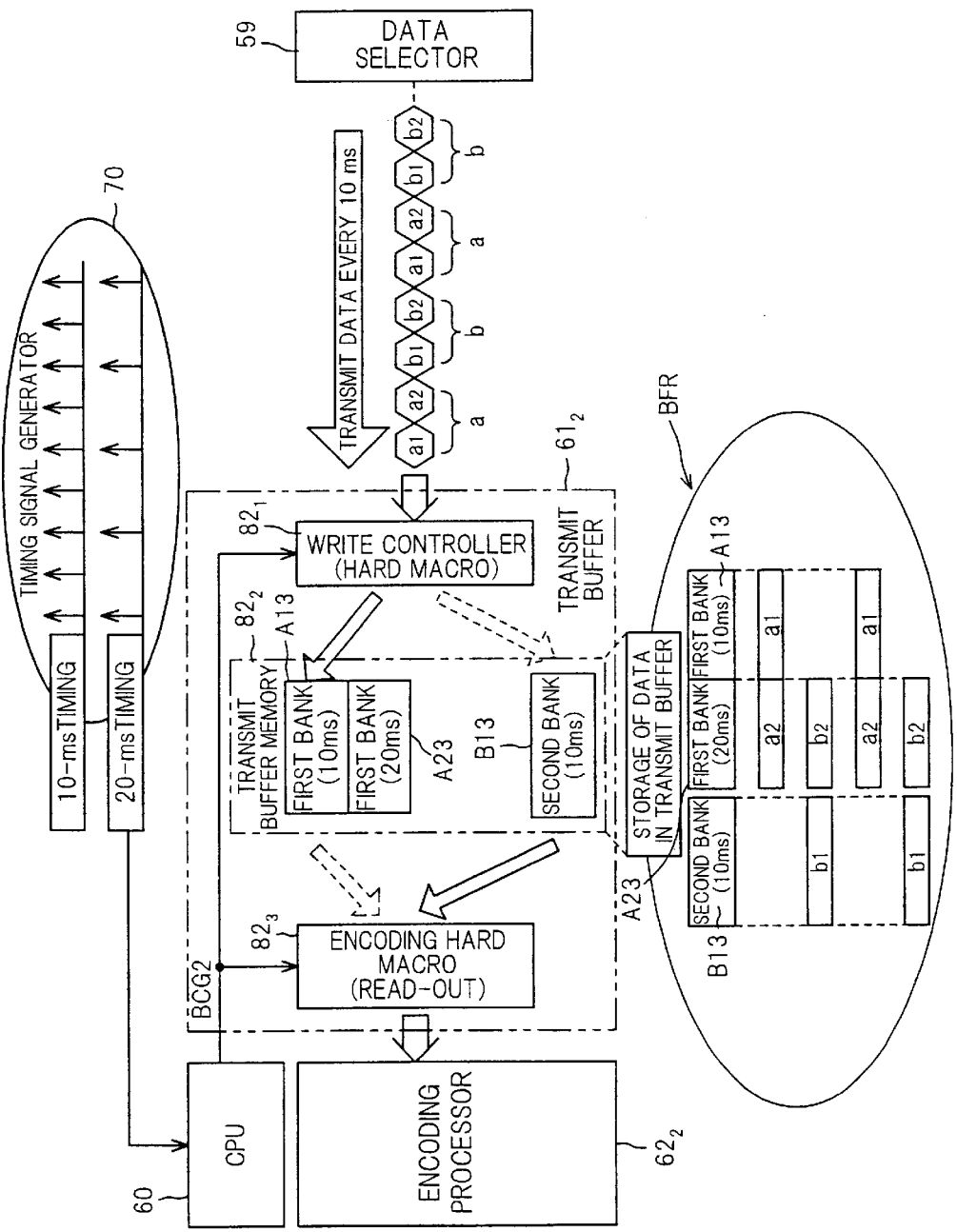
FIG. 10 illustrates an operation for switching the banks of a transmit buffer for 20 ms.

Transmit buffer for 20 ms (FIG. 10)

The processor 60 inputs a bank switching signal BCG2 to the transmit buffer $61_2$, which is for the length of encoding time of 20 ms, based upon a 20-ms timing signal that enters from the timing signal generator 70. In accordance with the bank switching signal BCG2, a write controller (hard macro) $82_1$ in the transmit buffer $61_2$ writes transmit data a (a1,a2), b (b1,b2), a (a1,a2), b (b1,b2), . . . of lengths 20 ms, which enters from the data selector 59, to storage areas A13, A23 of the first band and storage area B13 of the second bank in a transmit buffer memory $82_2$, and an encoding hard macro $82_3$ reads 20 millisecond's worth of transmit data, which was written in the preceding cycle, out of the storage area B13 of the first bank and storage areas A13 and A23 of the first bank in parallel with the write operation and inputs the data to the encoding processor $62_2$.

More specifically, as indicated at BFR in FIG. 10, (1) transmit data a1, a2 of length 20 ms (=2×10 ms) is written successively to first and second storage areas A13, A23 of the first bank every 10 ms; (2) of succeeding transmit data b1, b2 of length 20 ms (=2×10 ms), initial transmit data b1 of length 10 ms is written to the storage area B13 of the second bank and the remaining transmit data b2 of length 10 ms is written to the second storage area A23 of the first bank. (3) The write processing of (1), (2) described above is subsequently repeated to write transmit data to the first and second banks. The transmit data is read out in parallel with the write processing described above. Specifically, (4) when the transmit data b1 of length 10 ms is being written to the storage area B13 of the second bank in the write processing of (2) described above, the transmit data a1, a2 of length 20 ms that was written to the first and second storage areas A13, A23 of the first bank is read out at high speed in burst fashion and is input to the encoding processor $62_2$. (5) When the transmit data a1 of length 10 ms is being written to the first storage area A13 of the first bank in the write processing of (1) described above, the transmit data b1, b2 of length 20 ms that was written to the storage area B13 of the second bank and to second storage area A23 of the first bank is read out at high speed in burst fashion and is input to the encoding processor $62_2$. (6) The read-out processing of (4), (5) described above is repeated to read transmit data out of the first and second banks and input the data to the encoding processor $62_2$.

Figure 11:
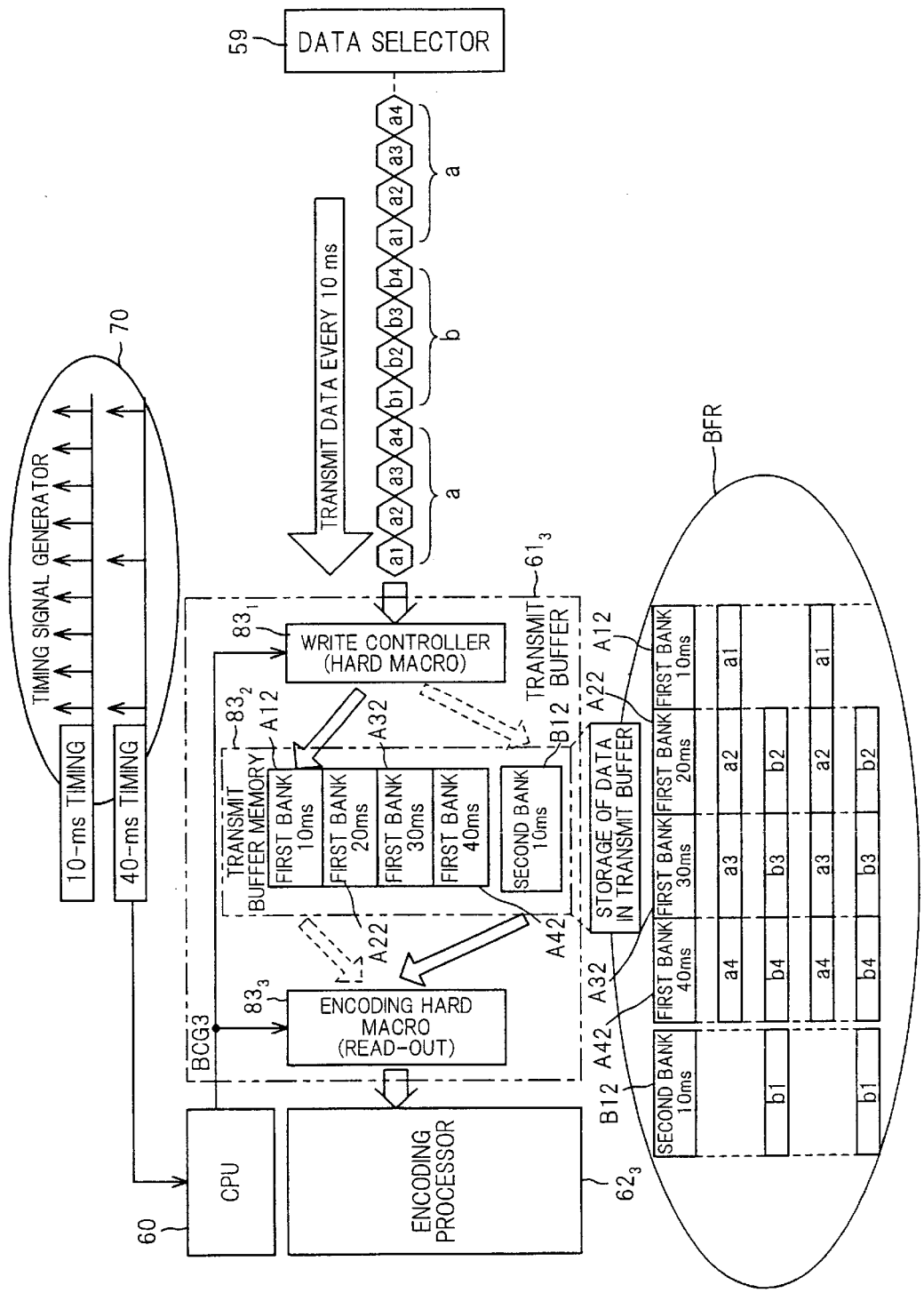
FIG. 11 illustrates an operation for switching the banks of a transmit buffer for 40 ms.

Transmit Buffer for 40 ms (FIG. 11)

The processor 60 inputs a bank switching signal BCG3 to the transmit buffer $61_3$, which is for the length of encoding time of 40 ms, based upon a 20-ms timing signal that enters from the timing signal generator 70. In accordance with the bank switching signal BCG3, a write controller (hard macro) $83_1$ in the transmit buffer $61_3$ writes transmit data a (a1,a2, a3,a4), b (b1,b2,b3,b4), a (a1,a2,a3,a4), . . . of lengths 40 ms, which enters from the data selector 59, to storage areas A12 to A42 of the first bank and storage area B12 of the second bank in a transmit buffer memory $83_2$, and an encoding hard macro $83_3$ reads 40 millisecond's worth of transmit data, which was written in the preceding cycle, out of the storage area B12 of the second bank and A12 to A42 of the first bank in parallel with the write operation and inputs the data to the encoding processor $62_3$.

More specifically, as indicated at BFR in FIG. 11, (1) transmit data a1 to a4 of length 40 ms (=4×10 ms) is written successively to first to fourth storage areas A12 to A42 of the first bank every 10 ms; (2) of succeeding transmit data b1 to b4 of length 40 ms (=4×10 ms), initial transmit data b1 of length 10 ms is written to the storage area B12 of the second bank and the remaining transmit data b2 to b4 of length 30 ms is written to the second to fourth storage areas A22 to A42 of the first bank. (3) The write processing of (1), (2) described above is subsequently repeated to write transmit data to the first and second banks. The transmit data is read out in parallel with the write processing described above. Specifically, (4) when the transmit data b1 of length 10 ms is being written to the storage area B12 of the second bank in the write processing of (2) described above, the transmit data a1 to a4 of length 40 ms that was written to the first to fourth storage areas A12 to A42 of the first bank is read out at high speed in burst fashion and is input to the encoding processor $62_3$. (5) When the transmit data a1 of length 10 ms is being written to the first storage area A12 of the first bank in the write processing of (1) described above, the transmit data b1 to b4 of length 40 ms that was written to the storage area B12 of the second bank and to the second to fourth storage areas A22 to A42 of the first bank is read out at high speed in burst fashion and is input to the encoding processor $62_3$. (6) The read-out processing of (4), (5) described above is repeated to read transmit data out of the first and second banks and input this data to the encoding processor $62_3$.

Figure 12:
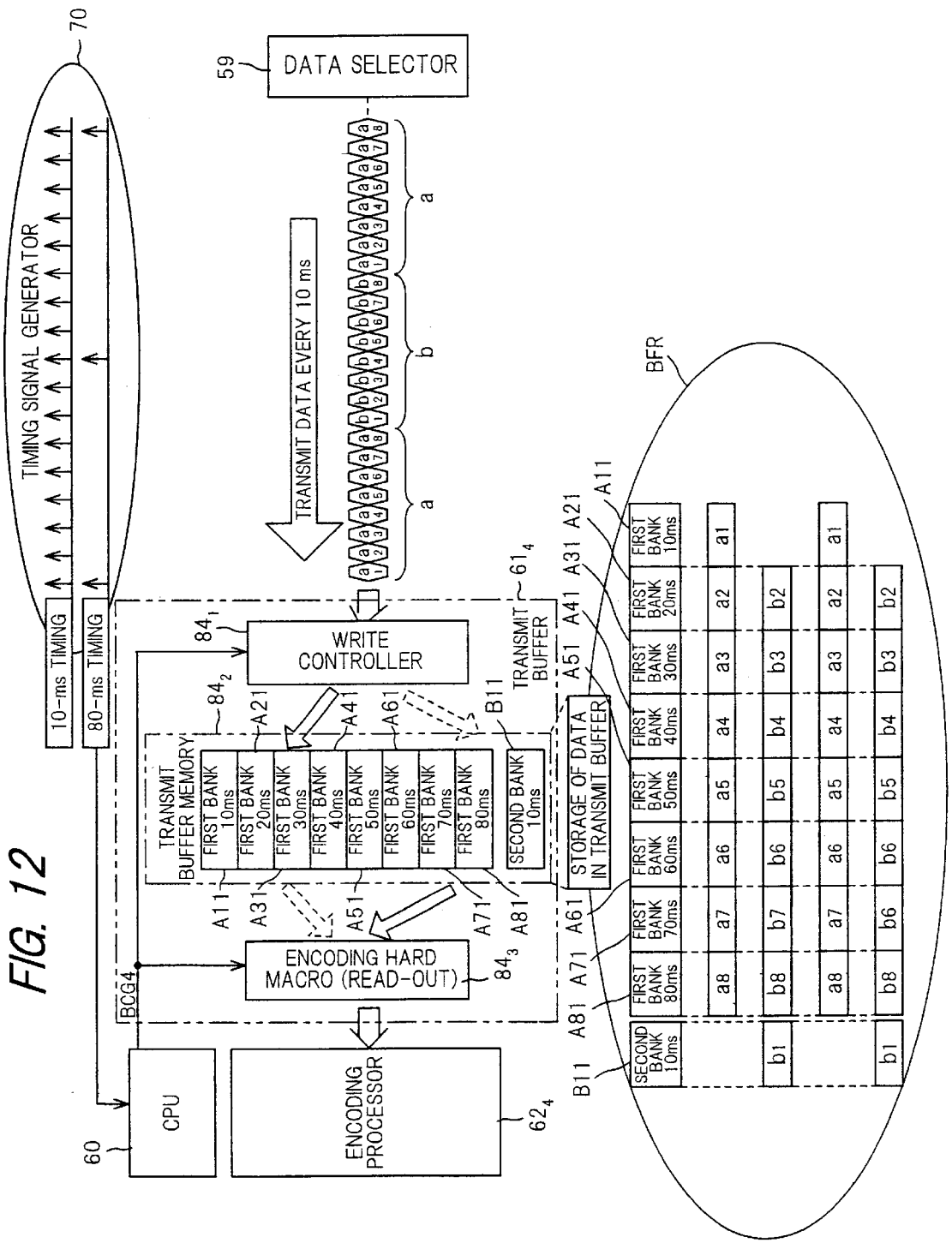
FIG. 12 illustrates an operation for switching the banks of a transmit buffer for 80 ms.

Transmit buffer for 80 ms (FIG. 12)

The processor 60 inputs a bank switching signal BCG4 to the transmit buffer $61_4$, which is for the length of encoding time of 80 ms, based upon an 80-ms timing signal that enters from the timing signal generator 70. In accordance with the bank switching signal BCG4, a write controller (hard macro) $84_1$ in the transmit buffer $61_4$ writes transmit data a (a1,a2, a3,a4,a5,a6,a7,a8), b (b1,b2,b3,b4,b5,b6,b7,b8), a (a1,a2,a3, a4,a5,a6,a7,a8), . . . of lengths 80 ms, which enters from the data selector 59, to storage areas A12 to A81 of the first bank and storage area B11 of the second bank in a transmit buffer memory $84_2$, and an encoding hard macro $84_3$ reads 80 millisecond's worth of transmit data, which was written in the preceding cycle, out of the storage area B11 of the second bank and storage areas A11 to A81 of the first bank in parallel with the write operation and inputs the data to the encoding processor $62_4$.

More specifically, as indicated at BFR in FIG. 12, (1) transmit data a1 to a8 of length 80 ms (=8×10 ms) is written successively to first to eighth storage areas A11 to A81 of the first bank every 10 ms; (2) of succeeding transmit data b1 to b8 of length 80 ms (=8×10 ms), initial transmit data b1 of length 10 ms is written to the storage area B11 of the second bank and the remaining transmit data b2 to b8 of length 70 ms is written to the second to eighth storage areas A21 to A81 of the first bank. (3) The write processing of (1), (2) described above is subsequently repeated to write transmit data to the first and second banks. The transmit data is read out in parallel with the write processing described above. Specifically, (4) when the transmit data b1 of length 10 ms is being written to the storage area B11 of the second bank in the write processing of (2) described above, the transmit data a1 to a8 of length 80 ms that was written to the first to eighth storage areas A11 to A81 of the first bank is read out at high speed in burst fashion and is input to the encoding processor $62_4$. (5) When the transmit data a1 of length 10 ms is being written to the first storage area A11 of the first bank in the write processing of (1) described above, the transmit data b1 to b8 of length 80 ms that was written to the storage area B11 of the second bank and to the second to eighth storage areas A21 to A81 of the first bank is read out at high speed in burst fashion and is input to the encoding processor $62_4$. (6) The read-out processing of (4), (5) described above is repeated to read transmit data out of the first and second banks and input the data to the encoding processor $62_4$.

(D) Control for Writing/Reading Data in Each Receive Buffer

FIGS. 13 to 16 are diagrams useful in describing operation for writing/reading data in the receive buffers $75_1$ to $75_4$. Components identical with those shown in FIG. 6 are designated by like reference characters.

Figure 13:
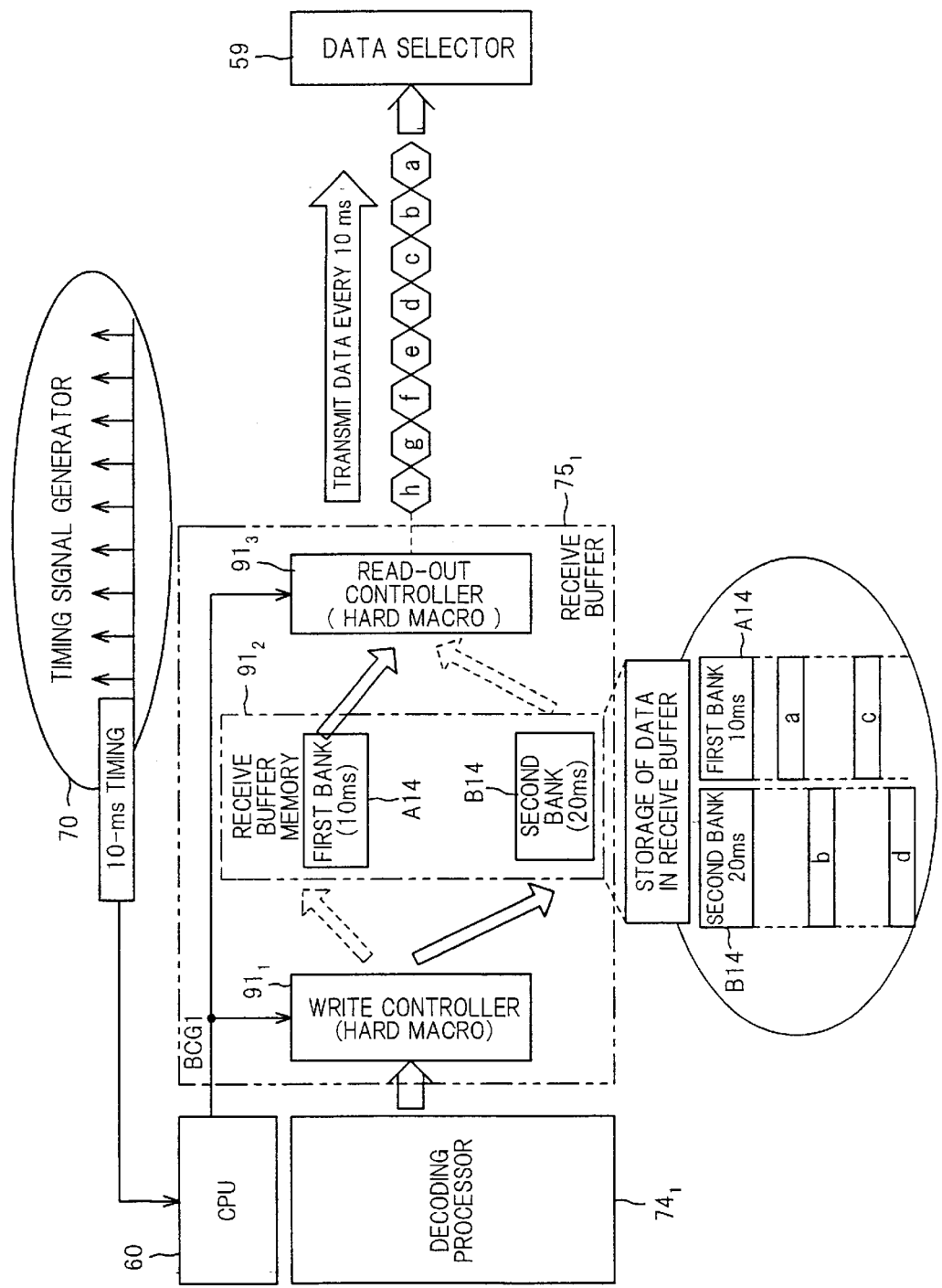
FIG. 13 illustrates an operation for switching the banks of a receive buffer for 10 ms.

Receive Buffer for 10 ms (FIG. 13)

The processor 60 inputs the bank switching signal BCG1 to the receive buffer $75_1$, which is for the length of encoding time of 10 ms, based upon the 10-ms timing signal that enters from the timing signal generator 70. In accordance with the bank switching signal BCG1, a write controller (hard macro) $91_1$ in the transmit buffer $75_1$ alternately writes decoded data a, b, c, d, . . . of lengths 10 ms, which enters from the decoding processor $74_1$, to storage areas A14 of the first bank and storage area B14 of the second bank in a receive buffer memory $91_2$, and a read-out controller (hard macro) $91_3$ alternately reads 10 millisecond's worth of decoded data, which was written in the preceding cycle, out of the storage area B14 of the first bank and storage area A14 of the second bank in parallel with the write operation and inputs the data to the data selector 59. In other words, as indicated at BFR in FIG. 13, decoded data a, b, c, d, . . . is alternately written to the storage areas A14, B14, the writing of the decoded data b to the storage area B14 and the read-out of the decoded data a from the storage area A14 are performed in parallel, the writing of the decoded data c to the storage area A14 and the read-out of the decoded data b from the storage area B14 are performed in parallel, and so on, with such write/read control proceeding in similar fashion.

Figure 14:
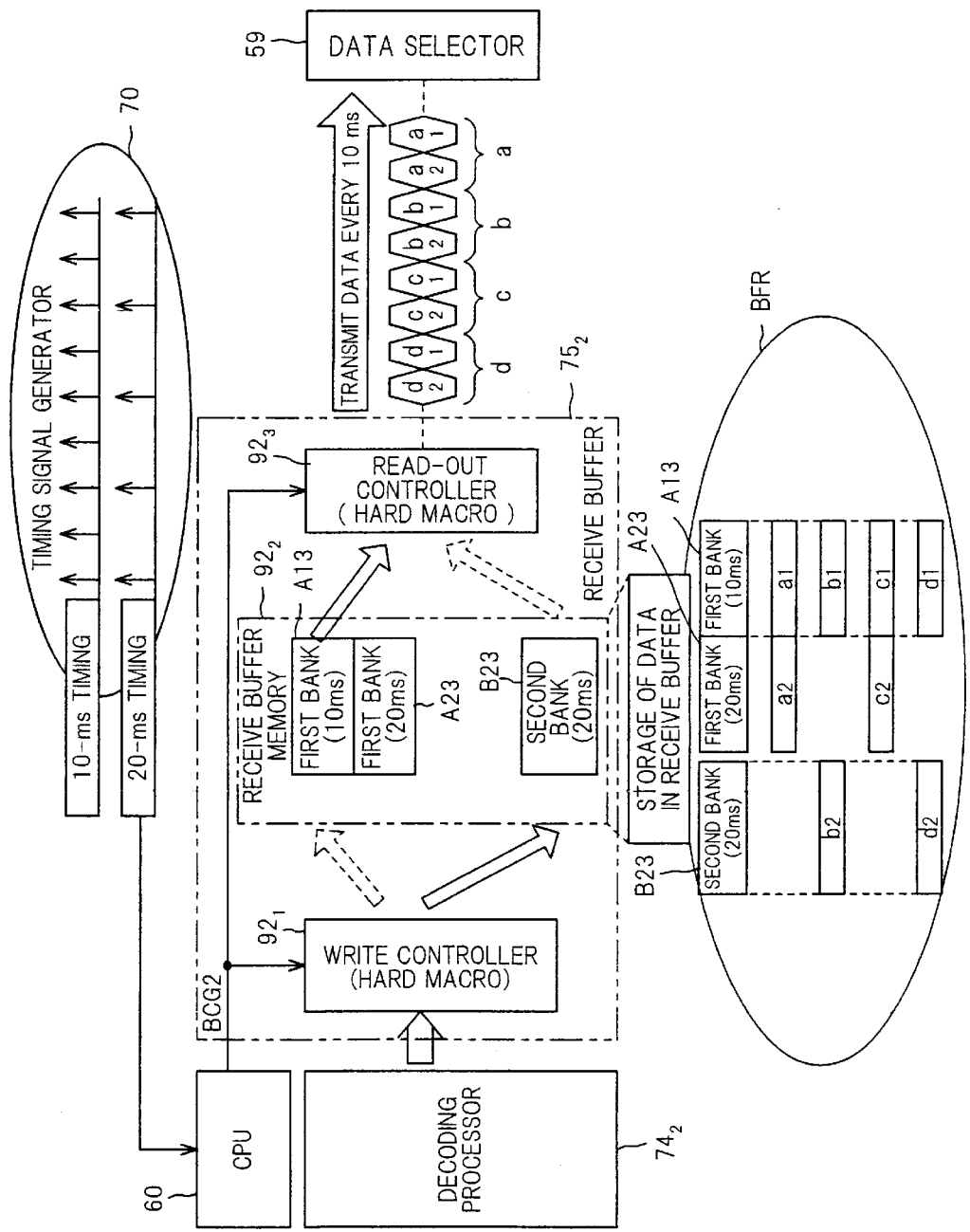
FIG. 14 illustrates an operation for switching the banks of a receive buffer for 20 ms.

Receive Buffer for 20 ms (FIG. 14)

The processor 60 inputs a bank switching signal BCG2 to the receive buffer $75_2$, which is for the length of encoding time of 20 ms, based upon a 20-ms timing signal that enters from the timing signal generator 70. In accordance with the bank switching signal BCG2, a write controller (hard macro) $92_1$ in the receiver buffer $75_2$ writes decoded data a (a1,a2), b (b1,b2), c (c1,c2), d (d1,d2), . . . of length 20 ms, which enters from the decoding processor $74_2$, to storage areas A13 and A23 of the first bank and storage area B13 of the second bank in a receive buffer memory $75_2$, and a read-out controller (hard macro) $92_3$ reads 20 millisecond's worth of decoded data, which was written in the preceding cycle, out of the storage area B13 of the second bank and storage areas A13 and A23 of the first bank in parallel with the write operation and inputs the data to the data selector 59.

More specifically, as indicated at BFR in FIG. 14, (1) decoded data a1, a2 of length 20 ms (=2×10 ms) is written at high speed in burst fashion to first and second storage areas A13, A23 of the first bank, after which the decoded data a1 of length 10 ms is read out of the first storage area A13 of the first bank at low speed. Next, (2) succeeding decoded data b1, b2 of length 20 ms is written at high speed in burst fashion to the first storage area A13 of the first bank and to the storage area B23 of the second bank in parallel with read-out of the decoded data a2 of length 10 ms from the second storage area A23 of the first bank, after which the decoded data b1 of length 10 ms is read out of the first storage area A13 of the first bank at low speed. (3) Next, succeeding decoded data c1, c2 of length 20 ms is written at high speed in burst fashion to the first and second storage areas A13, A23 of the first bank in parallel with read-out of the decoded data b2 of length 10 ms from the storage area B23 of the second bank, after which the decoded data c1 of length 10 ms is read out of the first storage area A13 of the first bank at low speed. The write and read processing of (2), (3) above is subsequently repeated to write decoded data to the first and second banks and read the data out of the first and second banks.

Figure 15:
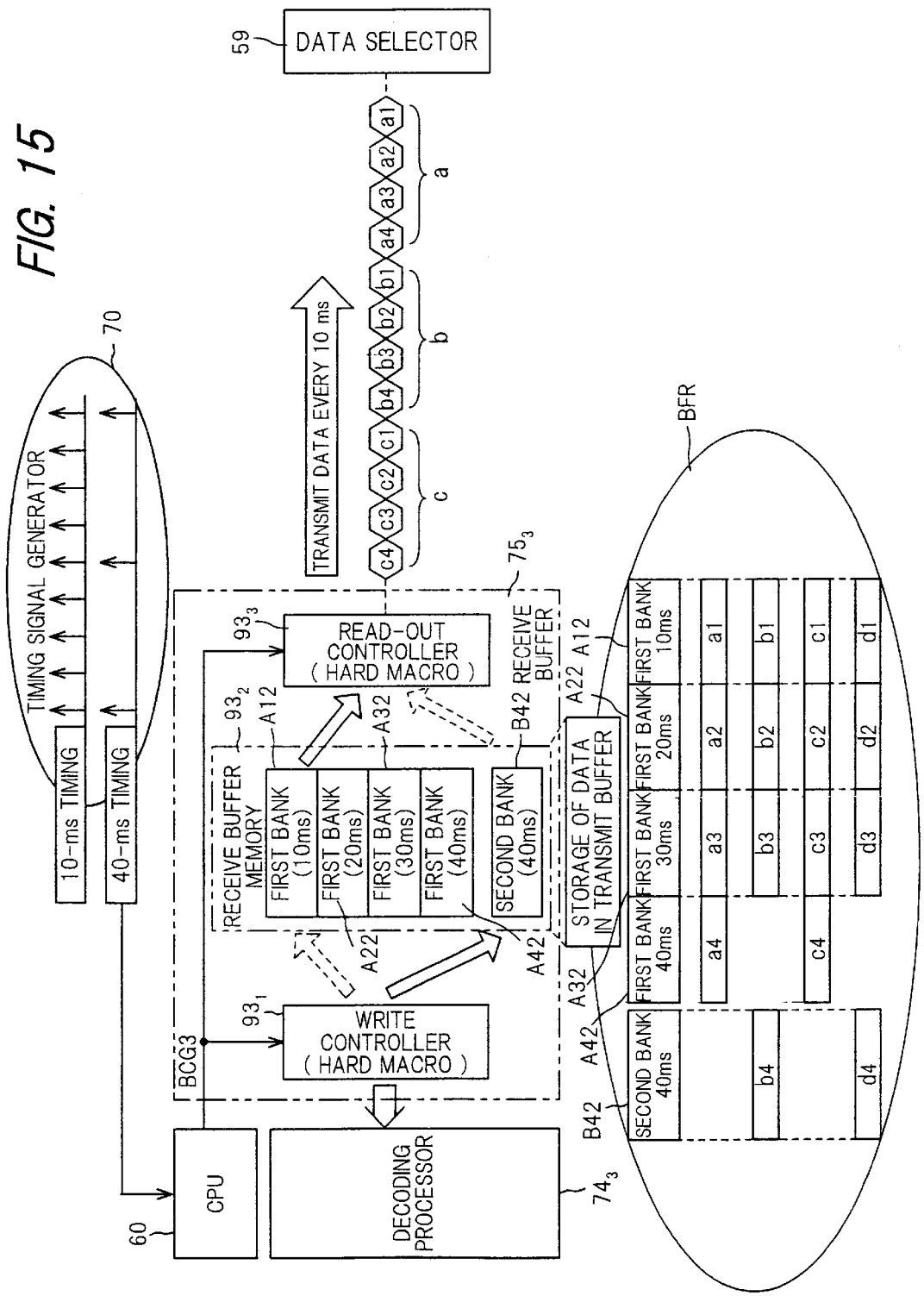
FIG. 15 illustrates an operation for switching the banks of a receive buffer for 40 ms.

Receive Buffer for 40 ms (FIG. 15)

The processor 60 inputs a bank switching signal BCG3 to the receive buffer $75_3$, which is for the length of encoding time of 40 ms, based upon a 40-ms timing signal that enters from the timing signal generator 70. In accordance with the bank switching signal BCG3, a write controller (hard macro) $93_1$ in the receive buffer $75_3$ writes decoded data a (a1,a2, a3,a4), b (b1,b2,b3,b4), c (c1,c2,c3,c4), . . . of lengths 40 ms, which enters from the decoding processor $74_3$, to storage areas A12 to A42 of the first bank and storage area B42 of the second bank in a receive buffer memory $75_3$, and a read-out controller (hard macro) $93_3$ reads 40 millisecond's worth of transmit data, which was written in the preceding cycle, out of the storage area B42 of the first bank and storage areas A12 to A42 of the second bank in parallel with the write operation and inputs the data to the data selector 59.

More specifically, as indicated at BFR in FIG. 15, (1) decoded data a1 to a4 of length 40 ms (=4×10 ms) is written at high speed in burst fashion to first to fourth storage areas A12 to A42 of the first bank, after which the decoded data a1 to a3 is read out of the first to third storage areas A12 to A32 of the first bank 20 ms at a time at low speed. Next, (2) succeeding decoded data b1 to b4 of length 40 ms is written at high speed in burst fashion to the first to third storage areas A12 to A32 of the first bank and storage area B42 of the second bank in parallel with read-out of the final decoded data a4 of length 10 ms from the fourth storage area A42 of the first bank, after which the decoded data b1 to b3 is read out of the first to third storage areas A12 to A32 of the first bank 10 ms at a time at low speed. Next, (3) succeeding decoded data c1 to c4 of length 40 ms is written at high speed to the first to fourth storage areas A12 to A42 of the first bank in parallel with read-out of the final decoded data b4 of length 10 ms from the storage area B42 of the second bank, after which the decoded data c1 to c3 is read out of the first to third storage areas A12 to A32 of the first bank 10 ms at a time at low speed. The write and read processing of (2), (3) above is subsequently repeated to write transmit data to the first and second banks and read the data out of the first and second banks.

Figure 16:
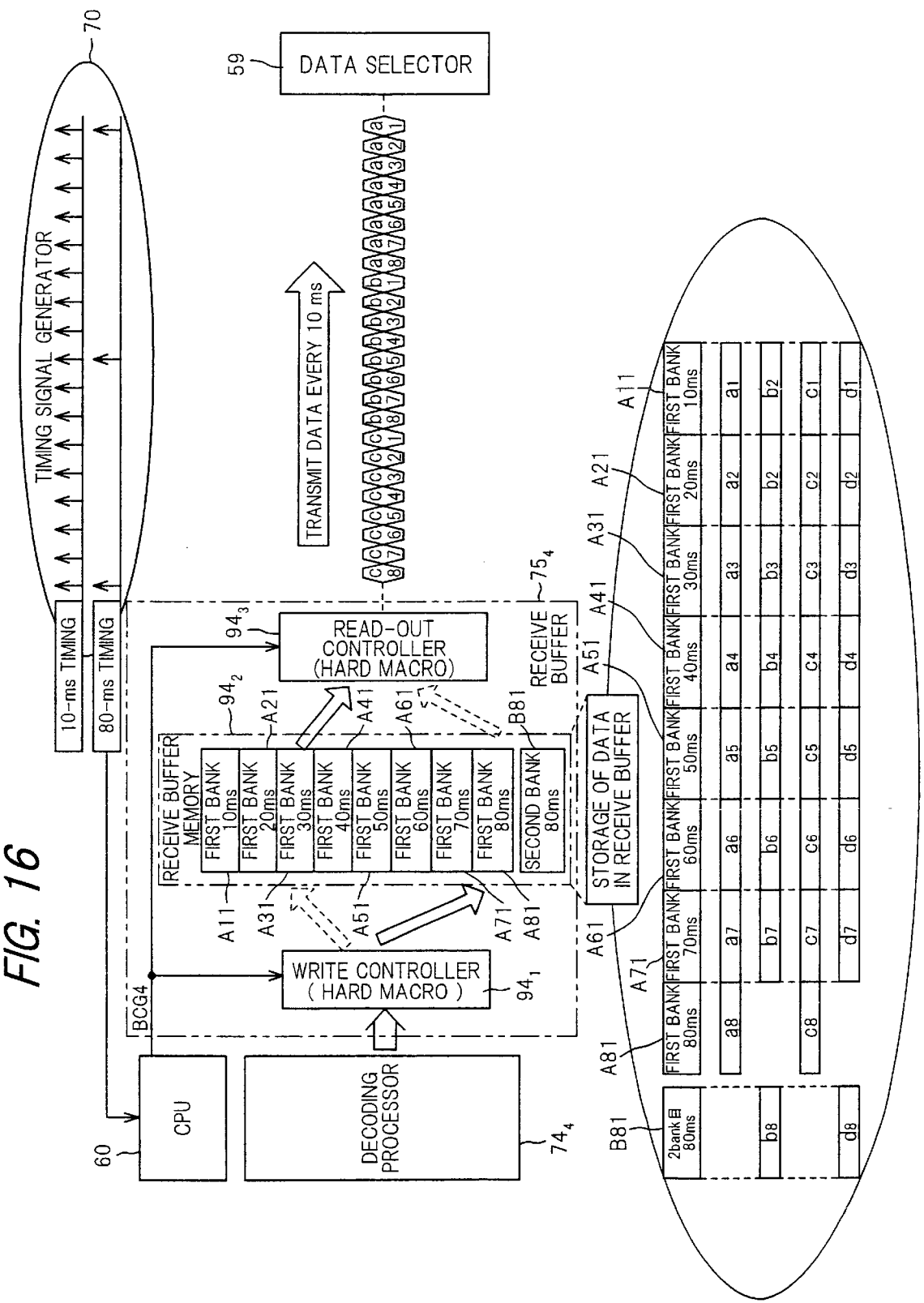
FIG. 16 illustrates an operation for switching the banks of a receive buffer for 80 ms.
Figure 17:
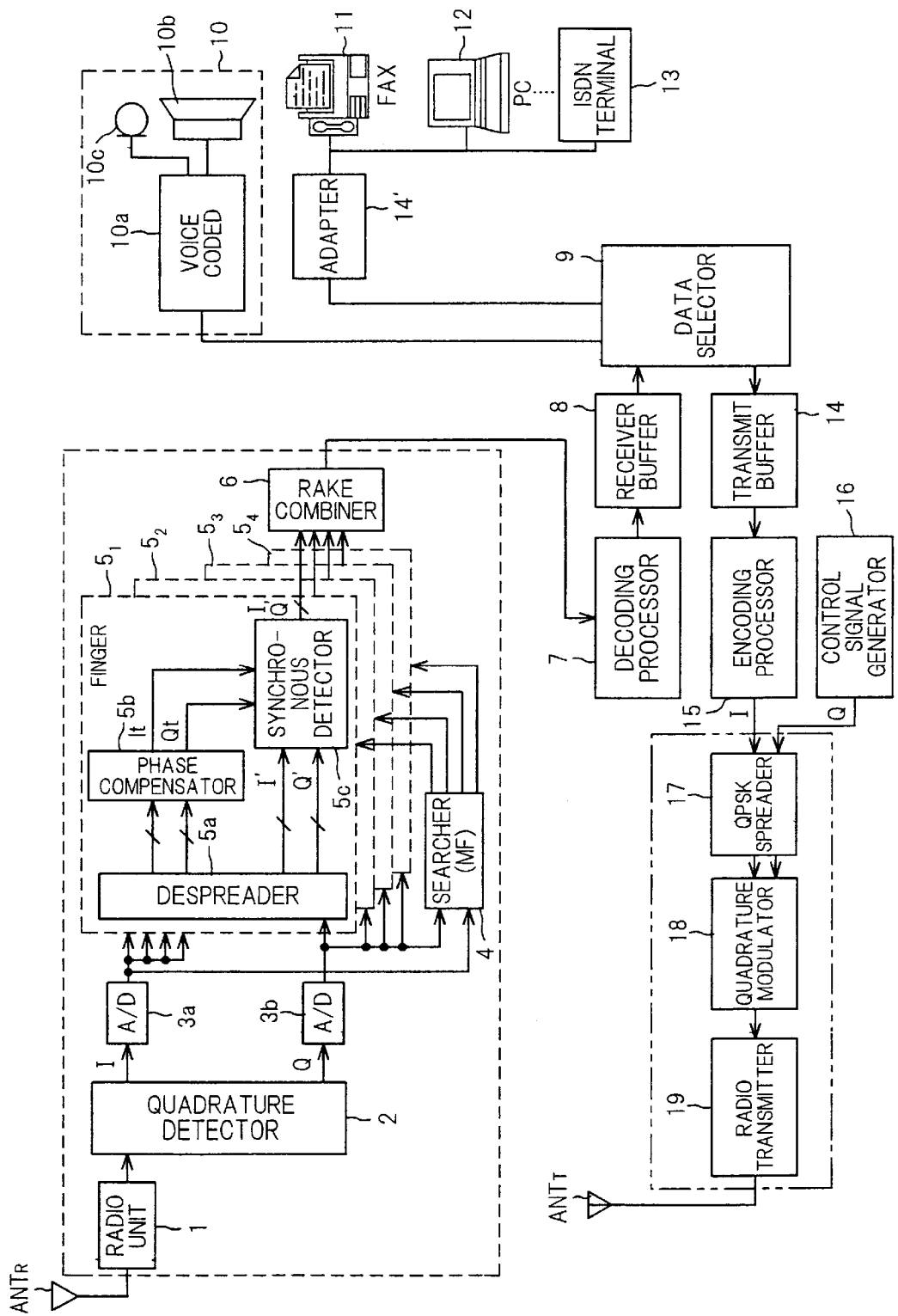
FIG. 17 is a block diagram of a mobile station according to the prior art.
Figure 18:
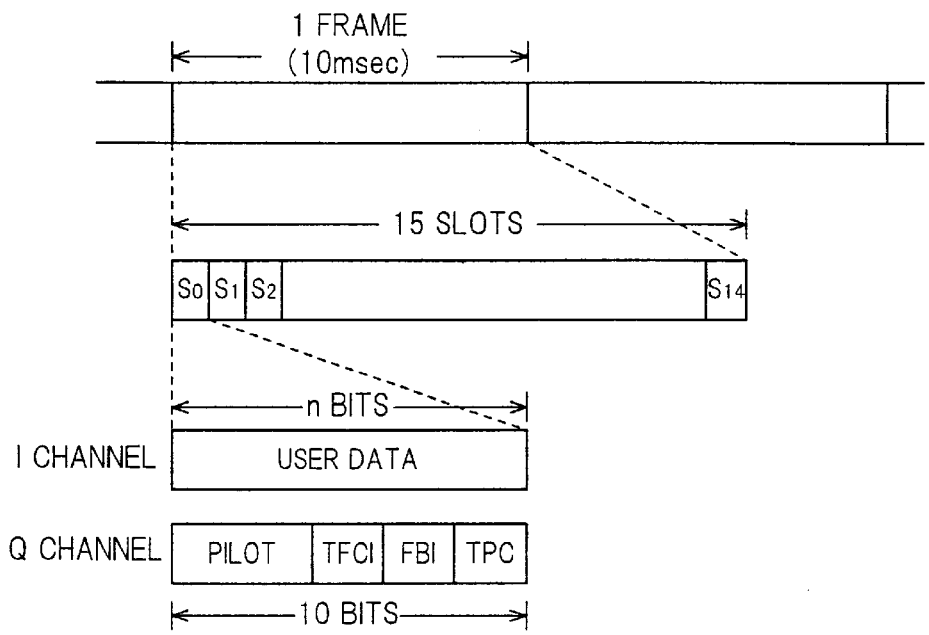
FIG. 18 illustrates an up-link frame format according to the prior art.
Figure 19:
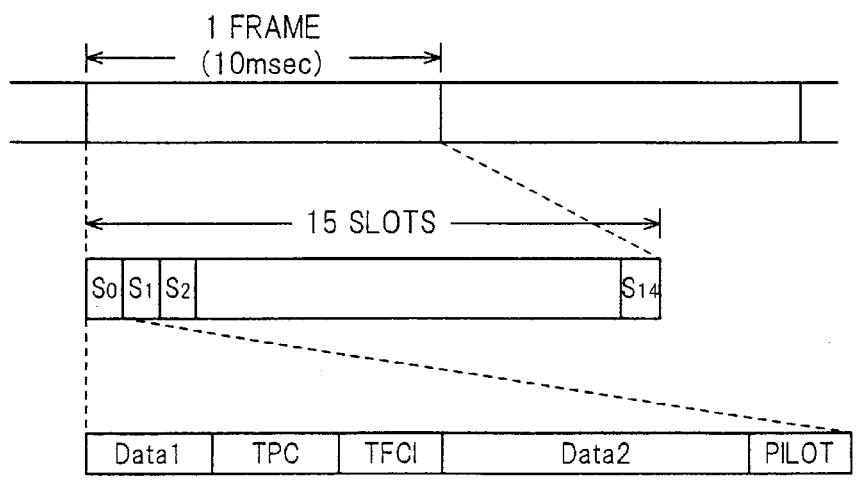
FIG. 19 illustrates a down-link frame format according to the prior art.
Figure 20:
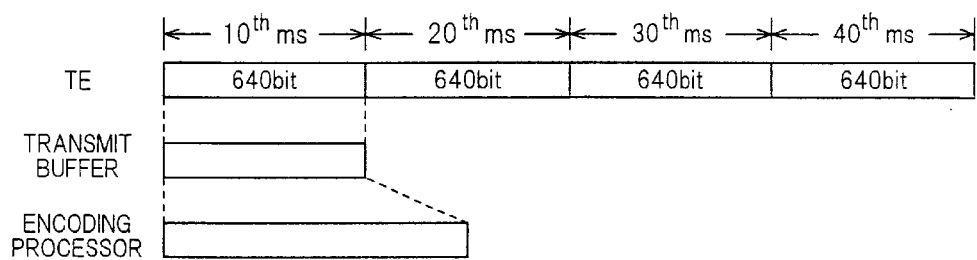
FIG. 20 illustrates an example of processing executed 640 bits at a time in a mobile radio unit according to the prior art.
Figure 21:
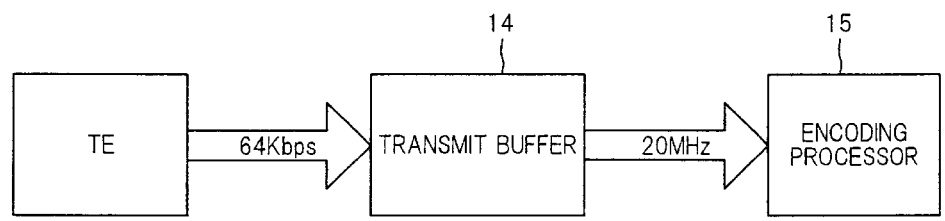
FIG. 21 illustrates a processing-speed conversion using a transmit buffer according to the prior art.
Figure 22:
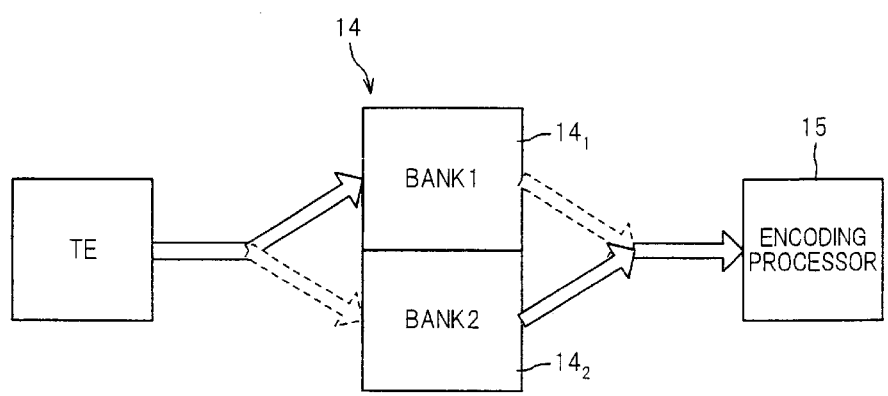
FIG. 22 illustrates bank switching according to the prior art.
Figure 23:
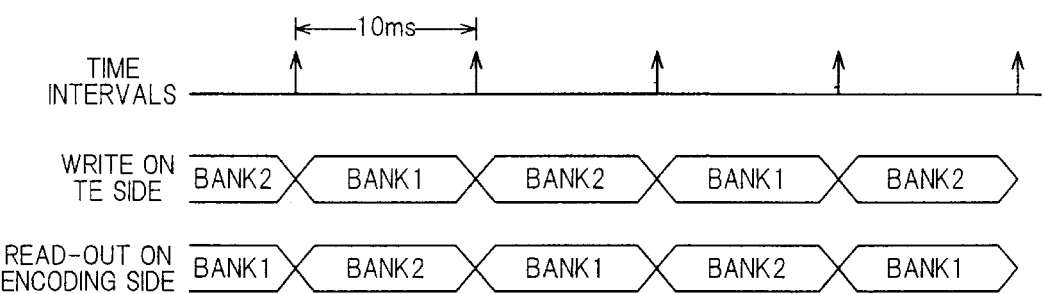
FIG. 23 illustrates bank access executed at time intervals according to the prior art.
Figure 24:
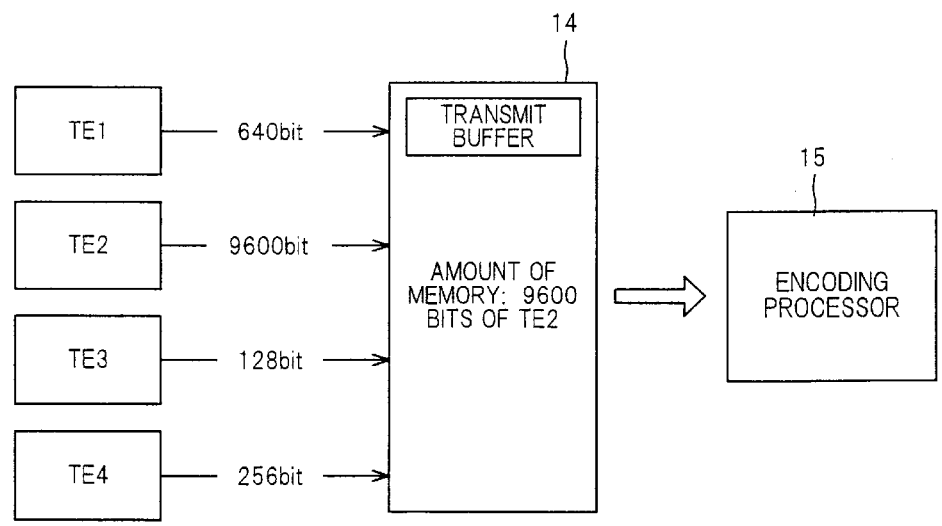
FIG. 24 illustrates sharing of a transmit buffer according to the prior art.
Figure 25:
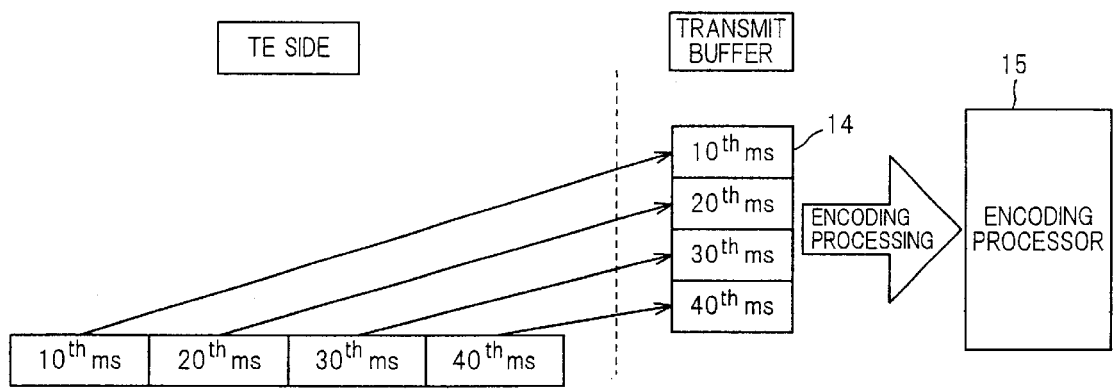
FIG. 25 shows an example in which 40 millisecond's worth of data from terminal equipment is multiplexed according to the prior art.
Figure 26:
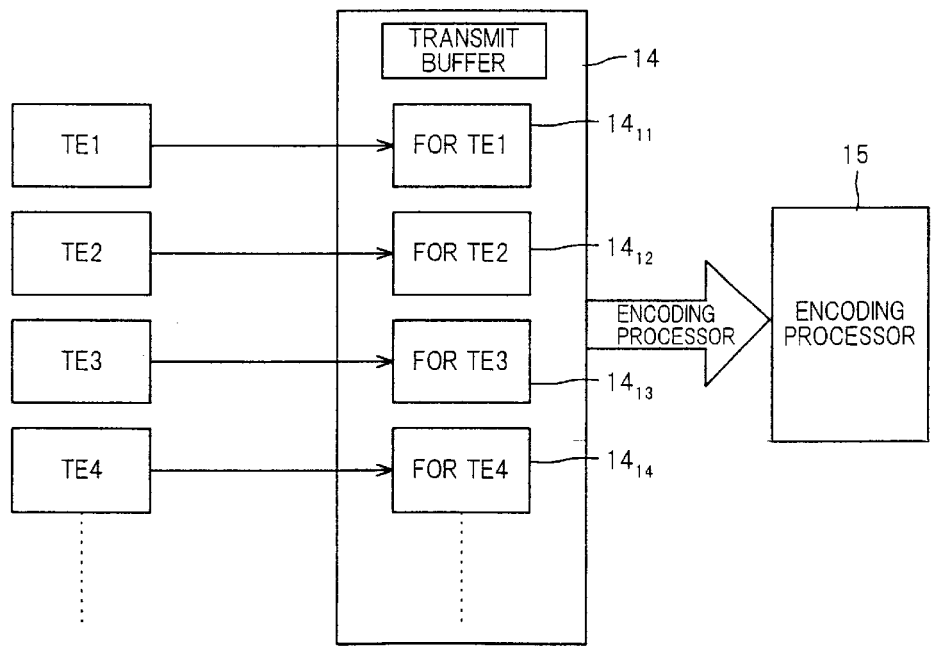
FIG. 26 shows an example in which a transfer buffer is provided for every service according to the prior art.
Figure 27:
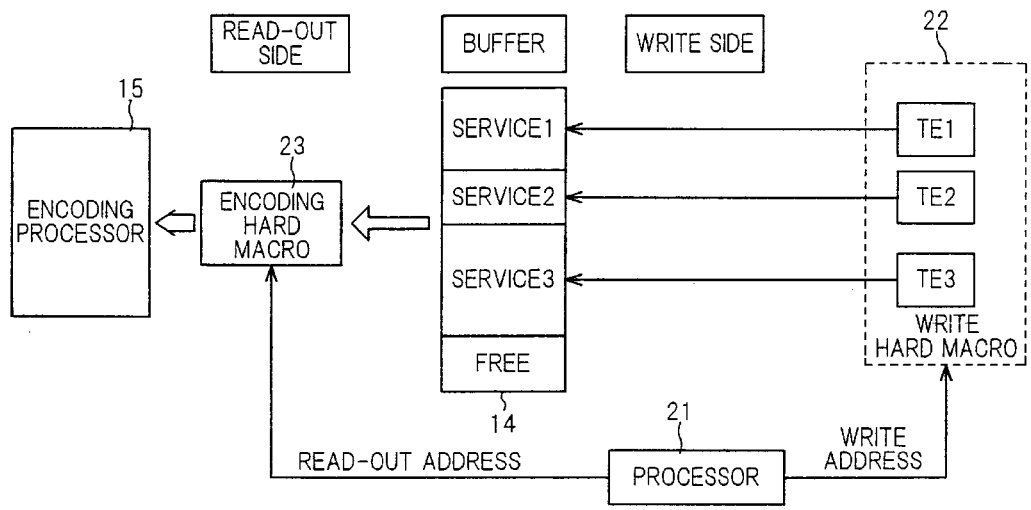
FIG. 27 illustrates addressing on write and read sides according to the prior art.
Figure 28:
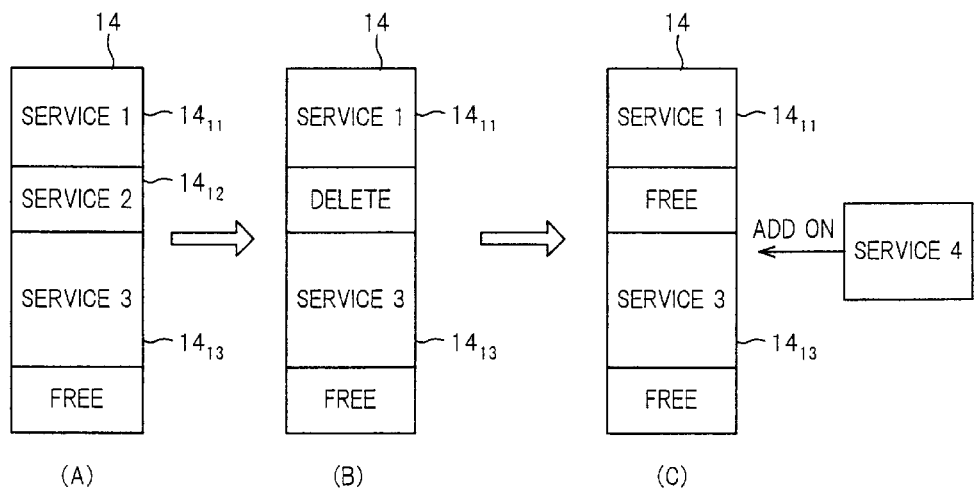
FIG. 28 illustrates addition/deletion of services according to the prior art.

Receive Buffer for 80 ms (FIG. 16)

The processor 60 inputs a bank switching signal BCG4 to the receive buffer $75_4$, which is for the length of encoding time of 80 ms, based upon an 80-ms timing signal that enters from the timing signal generator 70. In accordance with the bank switching signal BCG4, a write controller (hard macro) $94_1$ in the receive buffer $75_4$ writes decoded data a (a1,a2, a3,a4,a5,a6,a7,a8), b (b1,b2,b3,b4,b5,b6,b7,b8), a (a1,a2,a3, a4,a5,a6,a7,a8), . . . of lengths 80 ms, which enters from the decoding processor $74_4$, to storage areas A11 to A81 of the first bank and storage area B81 of the second bank in a receive buffer memory $75_4$, and a read-out controller (hard macro) $94_3$ reads 80 millisecond's worth of decoded data, which was written in the preceding cycle, out of the storage area B81 of the second bank and storage areas A11 to A81 of the first bank in parallel with the write operation and inputs the data to the data selector 59.

More specifically, as indicated at BFR in FIG. 16, (1) decoded data a1 to a8 of length 80 ms (=8×10 ms) is written at high speed in burst fashion to first to eighth storage areas A11 to A81 of the first bank, after which the decoded data a1 to a7 of length 10 ms is read out of the first to seventh storage areas A11 to A71 of the first bank 10 ms at a time at low speed. Next, (2) succeeding decoded data b1 to b8 of length 80 ms is written at high speed in burst fashion to the first to seventh storage areas A11 to A71 of the first bank and to the storage area B81 of the second bank in parallel with read-out of the final decoded data a8 of length 10 ms from the eighth storage area A81 of the first bank, after which the decoded data b1 to b7 is read out of the first to seventh storage areas A11 to A71 of the first bank 10 ms at a time at low speed. Next, (3) succeeding decoded data c1 to c8 of length 80 ms is written at high speed to the first to eighth storage areas A11 to A81 of the first bank in parallel with read-out of the final decoded data a8 of length 10 ms from the storage area B81 of the second bank, after which the decoded data c1 to c7 is read out of the first to seventh storage areas A11 to A71 of the first bank 10 ms at a time at low speed. The write and read processing of (2), (3) above is subsequently repeated to write transmit data to the first and second banks and read the data out of the first and second banks.

Thus, in accordance with the present invention, it will suffice to provide a small-capacity memory, which is for storing data of reference time T, as the second bank for each service. This makes it possible to reduce the overall amount of memory. Further, it can be so arranged that data having different lengths of encoding time will not be stored in memory. This simplifies address management and bank switching.

Further, in accordance with the present invention, transmit data of maximum length of encoding time is stored, on a per-service basis, in a first storage unit serving as a first bank. As a result, services of any lengths of encoding time can be connected using a comparatively small amount of memory.

As many apparently widely different embodiments of the present invention can be made without departing from the spirit and scope thereof, it is to be understood that the invention is not limited to the specific embodiments thereof except as defined in the appended claims.

What is claimed is:

1. A transmitting apparatus for storing transmit data, which relates to respective ones of N-number of $1^{st}$ to $N^{th}$ services, in lengths equivalent to a multiple $n_i$ (i=1, 2, ..., N) of a reference time length T, reading out the stored transmit data $n_i \cdot T$ at a time, encoding each read item of transmit data of length $n_i \cdot T$, and transmitting the encoded data, comprising:

a transmit buffer having a first storage unit for storing, on a per-service basis, transmit data of length $n_i \cdot T$, and a second storage unit for storing, on a per-service basis, transmit data of the reference time length T;

an encoding processor for encoding and then outputting transmit data of each service of length $n_i \cdot T$ (i=1, 2, ..., N); and a controller which, on a per-service basis, stores the transmit data of length $n_i \cdot T$ in said transmit buffer continuously, reference time length T at a time, at low speed; then, after storage of this data, reads already stored transmit data of length $n_i \cdot T$ out of said transmit buffer at high speed in parallel with storage of succeeding transmit data of reference time length T in said transmit buffer; then subsequently performs, in parallel fashion, low-speed continuous storage of transmit data of length $n_i \cdot T$ and high-speed intermittent read-out of already stored transmit data of length $n_i \cdot T$; and inputs, to said encoding processor, the transmit data that has been read out;

a multiplexer for multiplexing data obtained by the encoding processing of transmit data of length $n_i \cdot T$ of each service; and a transmitter for transmitting the multiplexed data.

2. The apparatus according to claim 1, wherein said controller performs the following operation on a per-service basis:

(1) writes transmit data of length $n_i \cdot T$ to $1^{st}$ to $n_i^{th}$ storage areas of the first storage unit time length T at a time; (2) of succeeding transmit data of length $n_i \cdot T$, writes initial transmit data of time length T to a storage area of the second storage unit and writes the remaining transmit data of length $(n_i-1) \cdot T$ to $2^{nd}$ to $n_i^{th}$ storage areas of the first storage area; (3) subsequently repeats the write processing of (1), (2) above to write transmit data to the first and second storage units; (4) when the transmit data of time length T is being written to the storage area of the second storage unit in the write processing of (2) above, reads out the transmit data of length $n_i \cdot T$ that was written to the first storage unit and inputs this transmit data to said encoding processor; (5) when the transmit data of time length T is being written to the first storage area of the first storage unit in the write processing of (1) above, reads out the transmit data of length $n_i \cdot T$ that was written to the storage area of the second storage unit and to the $2^{nd}$ to $n_i^{th}$ storage areas of the first storage unit and inputs this transmit data to said encoding processor.

3. The apparatus according to claim 1, wherein the length of time $n_i \cdot T$, which is the time during which encoding is executed, is set in advance for each service provided to a terminal, transmit data input from said terminal is divided at increments of length $n_i \cdot T$ and the divided data is input to an encoding processor via a transmit buffer, whereby the divided data is encoded.

4. A receiving apparatus for demultiplexing encoded data of N-number of $1^{st}$ to $N^{th}$ services that have been multiplexed and sent to the receiving apparatus, decoding demultiplexed encoded data of each $i^{th}$ service (i=1, 2, ..., N), storing the decoded data for lengths of time that are a multiple $n_i$ (i=1, 2, ..., N) of a reference time length T, reading out stored transmit data $n_1 \cdot T$ at a time, transmitting the data to a terminal, and performing, in parallel, storage and read-out of decoded data on a per-service basis, comprising:

a demultiplexer for demultiplexing encoded data of N-number of services from received data;

a decoding processor for decoding original data of length $n_i \cdot T$ from encoded data of each service;

a receive buffer having a first storage unit for storing, on a per-service basis, decoded data of length $n_i \cdot T$, and a second storage unit for storing, on a per-service basis, decoded data of the reference time length T; and a controller which, on a per-service basis, intermittently stores decoded data of length $n_i \cdot T$ in said receive buffer at high speed; of the stored decoded data of length $n_i \cdot T$, reads out decoded data of length $(n_i-1) \cdot T$ continuously, reference time length T at a time, at low speed; stores succeeding transmit data of length $n_i \cdot T$ in said receive buffer at high speed in parallel with read-out of final decoded data of reference time length T; then subsequently performs, in parallel fashion, low-speed continuous read-out of transmit data of length $n_i \cdot T$ and high-speed intermittent storage of transmit data of length $n_i \cdot T$.

5. The apparatus according to claim 4, wherein said controller performs the following operation on a per-service basis:

(1) writes decoded data of length $n_i \cdot T$ to $1^{st}$ to $n_i^{th}$ storage areas of the first storage unit at high speed and thenceforth reads decoded data out of $1^{st}$ to $(n_i-1)^{th}$ storage areas of the first storage unit, time length T at a time, at low speed; (2) writes succeeding decoded data of length $n_i \cdot T$ to $1^{st}$ to $(n_i-1)^{th}$ storage areas of the first storage unit and to the second storage unit at high speed in parallel with read-out of final decoded data of time length T from the $n_i^{th}$ storage area of the first storage unit, and thenceforth reads the decoded data out of the $1^{st}$ to $(n_i-1)^{th}$ storage areas of the first storage unit, time length T at a time, at low speed; and (3) writes succeeding decoded data of length $n_i \cdot T$ to $1^{st}$ to $n_i^{th}$ storage areas of the first storage unit at high speed in parallel with read-out of final decoded data of time length T from the second storage unit, and thenceforth reads the decoded data out of the $1^{st}$ to $(n_i-1)^{th}$ storage areas of the first storage unit, time length T at a time, at low speed; and (4) subsequently repeats the write and read-out processing of (2), (3) above to write and read transmit data to and from the first and second storage units.

* * * * *